(12) United States Patent
Balasubramanian et al.

(10) Patent No.: US 12,292,866 B2
(45) Date of Patent: May 6, 2025

(54) DATA UNIFICATION

(71) Applicant: Microsoft Technology Licensing, LLC, Redmond, WA (US)

(72) Inventors: Meiyalagan Balasubramanian, Redmond, WA (US); Lengning Liu, Redmond, WA (US); Aditya Kuppa, Redmond, WA (US); Kirk Hartmann Freiheit, Orlando, FL (US); Kalen Wong, Redmond, WA (US); Paula Budig Greve, Monroe, WA (US); Patrick Clinton Little, Seattle, WA (US); Lucas Pritz, Redmond, WA (US); Yue Wang, Bellevue, WA (US); Vivek Ravindranath Narasayya, Redmond, WA (US); Katchaguy Areekijseree, Woodinville, WA (US); Yeye He, Bellevue, WA (US); Surajit Chaudhuri, Kirkland, WA (US); Gaurav Ghosh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/331,169

(22) Filed: Jun. 7, 2023

(65) Prior Publication Data
US 2023/0315701 A1 Oct. 5, 2023

Related U.S. Application Data

(63) Continuation of application No. 17/490,908, filed on Sep. 30, 2021, now Pat. No. 11,714,790.

(51) Int. Cl.
*G06F 16/215* (2019.01)
*G06F 16/2455* (2019.01)

(52) U.S. Cl.
CPC ...... *G06F 16/215* (2019.01); *G06F 16/24556* (2019.01)

(58) Field of Classification Search
CPC ... G06F 16/215; G06F 16/24556; G06F 16/24
See application file for complete search history.

(56) References Cited

U.S. PATENT DOCUMENTS

2014/0222752 A1* 8/2014 Isman ................. G06F 11/3684
707/603
2014/0222793 A1* 8/2014 Sadkin ............... G06F 16/24578
707/723

(Continued)

OTHER PUBLICATIONS

"Asynchronous Messaging Options", Retrieved from: https://learn.microsoft.com/en-us/azure/architecture/guide/technology-choices/messaging, Retrieved on: Jul. 25, 2023, 14 Pages.

(Continued)

*Primary Examiner* — Maher N Algibhah
(74) *Attorney, Agent, or Firm* — Foley IP Law, PLLC

(57) ABSTRACT

Solutions for data unification include: receiving a data record, the data record comprising a plurality of data fields; selecting, from among the plurality of data fields, a subset of the data fields, the subset of the data fields being fewer in number than the plurality of data fields, wherein selecting the subset of the data fields comprises: applying a first rule to select at least a first one of the data fields within the data record for inclusion in the subset of the data fields; using content of the subset of the data fields, generating a stable identifier (stableID) for the data record; and inserting the stableID into a primary key data field of the data record.

20 Claims, 16 Drawing Sheets

(56) References Cited

U.S. PATENT DOCUMENTS

| | | | | |
|---|---|---|---|---|
| 2014/0279739 | A1* | 9/2014 | Elkington | G06N 20/00 |
| | | | | 706/12 |
| 2015/0006491 | A1* | 1/2015 | He | G06F 16/27 |
| | | | | 707/694 |
| 2015/0345969 | A1* | 12/2015 | McGavran | G06Q 30/0205 |
| | | | | 701/532 |
| 2018/0219836 | A1* | 8/2018 | Peterson | H04L 67/1097 |
| 2019/0377825 | A1* | 12/2019 | Chang | G06F 16/328 |
| 2020/0364223 | A1* | 11/2020 | Pal | G06F 16/24539 |
| 2020/0394194 | A1* | 12/2020 | Glover | G06F 16/24553 |
| 2021/0294797 | A1* | 9/2021 | Gupta | G06F 21/6254 |
| 2022/0121687 | A1* | 4/2022 | Tirupati | G06F 16/2379 |

OTHER PUBLICATIONS

"Azure Service Bus SubscriptionClient High Latency / not Receiving Messages Concurrently", Retrieved from: https://stackoverflow.com/questions/49347455/azure-service-bus-subscriptionclient-high-latency-not-receiving-messages-concu, Mar. 18, 2018, 3 Pages.

"Event Hubs Ingestion Performance and Throughput", Retrieved from: https://vincentlauzon.com/2018/06/05/event-hubs-ingestion-performance-and-throughput/, Jun. 5, 2018, 10 Pages.

"Latency of service bus message read / writes", Retrieved from: https://social.msdn.microsoft.com/Forums/en-US/fc4b844b-ec4b-4b91-86e9-596b06f686d9/latency-of-service-bus-message-read-writes?forum=windowsazuredata., Retrieved on: Jul. 25, 2023, 3 Pages.

"Service Level Agreement for Microsoft Online Services", Retrieved from: https://www.microsoft.com/licensing/docs/view/Service-Level-Agreements-SLA-for-Online-Services?lang=1, Retrieved on: Jul. 25, 2023, 17 Pages.

"Structured Streaming Programming Guide", Retrieved from: https://spark.apache.org/docs/latest/structured-streaming-programming-guide.html#support-matrix-for-joins-in-streaming-queries, Retrieved on: Jul. 25, 2023, 33 Pages.

Arnott, Andrew, "MessagePack for C# (.Net, .Net Core, Unity, Xamarin)", Retrieved from: https://github.com/MessagePack-CSharp/MessagePack-CSharp, Jun. 27, 2023, 48 Pages.

Backstrom, et al., "Group Formation in Large Social Networks: Membership, Growth, and Evolution", In Proceedings of the 12th Acm Sigkdd International Conference on Knowledge Discovery and Data Mining, Aug. 20, 2006, pp. 44-54.

Baldacci, et al., "A Cost Model for Spark Sql", In Journal of IEEE Transactions on Knowledge and Data Engineering, vol. 31, Issue 5, May 1, 2019, pp. 819-832.

Bateni, et al., "Affinity Clustering: Hierarchical Clustering at Scale", In Proceedings of 31st Conference on Neural Information Processing Systems, Dec. 4, 2017, 11 Pages.

Bien, et al., "Hierarchical Clustering With Prototypes via Minimax Linkage", In Journal of the American Statistical Association, vol. 106, Issue 495, Sep. 1, 2011, 10 Pages.

Cassidy, et al., "Reliable Collection object serialization in Azure Service Fabric", Retrieved from: https://learn.microsoft.com/en-us/azure/service-fabric/service-fabric-reliable-services-reliable-collections-serialization, Jul. 15, 2022, 5 Pages.

Christen, Peter, "Febrl - An Open Source Data Cleaning, Deduplication and Record Linkage System with a Graphical User Interface", In Proceedings of the 14th ACM SIGKDD International Conference on Knowledge Discovery and Data Mining, Aug. 24, 2008, pp. 1065-1068.

Cohen, et al., "Learning to Match and Cluster Large High-Dimensional Data Sets For Data Integration", In Proceedings of the Eighth ACM SIGKDD International Conference on Knowledge Discovery and Data Mining, Jul. 23, 2002, pp. 475-480.

Das, et al., "The Magellan Data Repository", Retrieved from: https://web.archive.org/web/20210205063535/https://sites.google.com/site/anhaidgroup/useful-stuff/data, Feb. 5, 2021, 8 Pages.

Dash, et al., "Fast Hierarchical Clustering and Its Validation", In Journal of Data & Knowledge Engineering, vol. 44, Issue 1, Jan. 1, 2003, pp. 1-37.

Dash, et al., "pPOP: Fast Yet Accurate Parallel Hierarchical Clustering using Partitioning", In Journal of Data & Knowledge Engineering, vol. 61, Issue 3, Jun. 2007, pp. 563-578.

Defays, Daniel, "An Efficient Algorithm for a Complete Link Method", Published in the Computer Journal, vol. 20, Issue 4, Jan. 1, 1977, pp. 364-366.

Ding, et al., "Cluster aggregate inequality and multi-level hierarchical clustering", In Proceedings of 9th European Conference on Principles and Practice of Knowledge Discovery in Databases, Oct. 3, 2005, pp. 71-83.

Downs, et al., "Clustering Methods and Their Uses in Computational Chemistry", In Journal of Reviews in Computational Chemistry, vol. 18, Oct. 8, 2002, pp. 1-40.

Eisen, et al., "Cluster Analysis and Display of Genome-Wide Expression Patterns", In Proceedings of the National Academy of Sciences, vol. 95, Issue 25, Dec. 8, 1998, p. 14863-14868.

Embrechts, et al., "Hierarchical Clustering for Large Data Sets", In Journal of Advances in Intelligent Signal Processing and Data Mining: Theory and Applications, 2013, pp. 197-233.

Gilpin, et al., "Efficient Hierarchical Clustering of Large High Dimensional Datasets", In Proceedings of the 22nd ACM International Conference on Information & Knowledge Management, Oct. 27, 2013, pp. 1371-1380.

Govender, et al., "Application of k-means and Hierarchical Clustering Techniques for Analysis of Air Pollution: A Review (1980-2019)", In Journal of Atmospheric Pollution Research, vol. 11, Issue 1, Jan. 2020, pp. 40-56.

Pedregosa, et al., "Scikit-Learn: Machine Learning in Python", In Journal of Machine Learning Research, vol. 12, Nov. 1, 2011, pp. 2825-2830.

Olson, Clark F., "Parallel Algorithms for Hierarchical Clustering", In Journal of Parallel Computing, vol. 21, Issue 8, Aug. 1995, pp. 1313-1325.

Gower, et al., "Minimum Spanning Trees and Single Linkage Cluster Analysis", In Journal of the Royal Statistical Society: Series C (Applied Statistics), vol. 18, Issue 1, Mar. 1969, pp. 54-64.

Herodotou, Herodotos, "Hadoop Performance Models", Retrieved from: https://web.archive.org/web/20120601174451/http://www.cs.duke.edu/starfish/files/hadoop-models.pdf, Jun. 1, 2012, pp. 1-19.

Herodotou, et al., "Profiling, What-If Analysis, and Cost-Based Optimization of Mapreduce Programs", In Proceedings of the VLDB Endowment, vol. 4, Issue 11, Aug. 1, 2011, pp. 1111-1122.

Jiang, et al., "Cluster Analysis for Gene Expression Data: A Survey", In Journal of IEEE Transactions on Knowledge and Data Engineering, vol. 16, Issue 11, Nov. 2004, pp. 1370-1386.

Jin, et al., "A Scalable Hierarchical Clustering Algorithm using Spark", In Proceedings of IEEE First International Conference on Big Data Computing Service and Applications, Mar. 30, 2015, pp. 418-427.

Johnson, Stephen C., "Hierarchical Clustering Schemes", In Journal of Psychometrika, vol. 32, Issue 3, Sep. 1967, pp. 241-254.

Klymko, et al., "Using Triangles to Improve Community Detection in Directed Networks", In Proceedings of the Second ASE International Conference on Big Data Science and Computing, May 27, 2014, 8 Pages.

Kraus, Alois, ".Net Serialization Benchmark 2019 Roundup", Retrieved from: https://aloiskraus.wordpress.com/2019/09/29/net-serialization-benchmark-2019-roundup/, Sep. 29, 2019, 19 Pages.

Lance, et al., "A General Theory of Classificatory Sorting Strategies: 1. Hierarchical Systems", In The Computer Journal, vol. 9, Issue 4, Feb. 1, 1967, pp. 373-380.

Leskovec, et al., "Community Structure in Large Networks: Natural Cluster Sizes and the Absence of Large Well-Defined Clusters", In Journal of Internet Mathematics, vol. 6, Issue 1, Jan. 1, 2009, pp. 29-123.

Leskovec, et al., "Mining of Massive Datasets", In Publication of Cambridge University Press, 2020, 603 Pages.

Leskovec, et al., "Stanford Large Network Dataset Collection", Retrieved from: http://snap.stanford.edu/data/, Jun. 2014, 6 Pages.

(56) References Cited

OTHER PUBLICATIONS

Li, et al., "Discovering Enterprise Concepts using Spreadsheet Tables", In Proceedings of the 23rd ACM SIGKDD International Conference on Knowledge Discovery and Data Mining, Aug. 13, 2017, pp. 1873-1882.

Li, Xiaobo, "Hierarchical Clustering on Simd Machines with Alignment Network", In Proceedings of IEEE Computer Society Conference on Computer Vision and Pattern Recognition, Jun. 4, 1989, pp. 660-665.

Li, Xiaobo, "Parallel Algorithms for Hierarchical Clustering and Cluster Validity", In Journal of IEEE Transactions on Pattern Analysis and Machine Intelligence, vol. 12, Issue 11, Nov. 1990, pp. 1088-1092.

Ma, et al., "DHC: Distributed, Hierarchical Clustering in Sensor Networks", In Journal of Computer Science and Technology, vol. 26, Issue 4, Jul. 11, 2011, pp. 643-662.

Mamun, et al., "Efficient Sequential and Parallel Algorithms for Record Linkage", In Journal of the American Medical Informatics Association, vol. 21, Issue 2, Mar. 1, 2014, pp. 252-262.

Müllner, Daniel, "Fastcluster: Fast Hierarchical, Agglomerative Clustering Routines for R and Python", In Journal of Statistical Software, vol. 53, Issue 9, May 29, 2013, pp. 1-18.

Murtagh, et al., "Algorithms for Hierarchical Clustering: An Overview", In Journal of Wiley Interdisciplinary Reviews: Data Mining and Knowledge Discovery, vol. 2, Issue 1, Jan. 2012, pp. 86-97.

Murtagh, et al., "Algorithms for Hierarchical Clustering: An Overview, II", In Journal of Wiley Interdisciplinary Reviews: Data Mining and Knowledge Discovery, vol. 7, Issue 6, Nov. 2017, pp. 1-16.

Murtagh, Fionn, "Complexities of Hierarchic Clustering Algorithms: State of the Art", In Journal of Computational Statistics Quarterly, vol. 1, Issue 2, 1984, pp. 101-113.

Olman, et al., "Parallel Clustering Algorithm for Large Data Sets with Applications in Bioinformatics", In Proceedings of IEEE/ACM Transactions on Computational Biology And Bioinformatics, vol. 6, Issue 2, Apr. 2009, pp. 344-352.

Zhang, et al., "DHC: A Distributed Hierarchical Clustering Algorithm for Large Datasets", In Journal of Circuits, Systems, and Computers, vol. 28, Issue 4, Apr. 4, 2019, 26 Pages.

Zhang, et al., "NNB: An Efficient Nearest Neighbor Search Method for Hierarchical Clustering on Large Datasets", In Proceedings of IEEE 9th International Conference on Semantic Computing, Feb. 7, 2015, pp. 405-412.

Pelluru, et al., "Availability and Consistency in Event Hubs", Retrieved from: https://learn.microsoft.com/en-us/azure/event-hubs/event-hubs-availability-and-consistency?tabs=dotnet, Mar. 13, 2023, 3 Pages.

Pelluru, et al., "Azure Event Hubs Quotas and Limits", Retrieved from: https://learn.microsoft.com/en-us/azure/event-hubs/event-hubs-quotas, Jun. 18, 2022, 5 Pages.

Pelluru, et al., "Event Hubs Frequently asked Questions", Retrieved from: https://learn.microsoft.com/en-us/azure/event-hubs/event-hubs-faq#what-is-the-messageevent-size-for-event-hubs, Retrieved on: Jul. 25, 2023, 14 Pages.

Pelluru, et al., "Overview of Azure Event Hubs Dedicated Tier", Retrieved from: https://learn.microsoft.com/en-us/azure/event-hubs/event-hubs-dedicated-overview, Jul. 1, 2023, 9 Pages.

Pelluru, et al., "Service Bus Quotas", Retrieved from: https://learn.microsoft.com/en-us/azure/service-bus-messaging/service-bus-quotas, Nov. 4, 2022, 4 Pages.

Rajasekaran, Sanguthevar, "Efficient Parallel Hierarchical Clustering Algorithms", In Journal of IEEE Transactions on Parallel and Distributed Systems, vol. 16, Issue 6, Jun. 2005, pp. 497-502.

Rasmussen, et al., "Effciency of Hierarchic Agglomerative Clustering using the ICL Distributed Array Processor", In Journal of Documentation, vol. 45, Issue 1, Mar. 1989, pp. 1-24.

Shepitsen, et al., "Personalized Recommendation in Social Tagging Systems Using Hierarchical Clustering", In Proceedings of the ACM conference on Recommender Systems, Oct. 23, 2008, pp. 259-266.

Sibson, Robin, "Slink: An Optimally Efficient Algorithm for the Single-Link Cluster Method", In The computer Journal, vol. 16, Issue 1, Jan. 1, 1973, pp. 30-34.

Sneath, p. H. A., "The Application of Computers to Taxonomy", In Journal of Microbiology, vol. 17, Issue 1, Aug. 1, 1957, pp. 201-226.

Sokal, et al., "A Statistical Method for Evaluating Systematic Relationships", Published In University of Kansas Science Bulletin, Mar. 20, 1958, pp. 1409-1438.

Sun, et al., "An Efficient Hierarchical Clustering Method for Large Datasets with Map-Reduce", In Proceedings of International Conference on Parallel and Distributed Computing, Applications and Technologies, Dec. 8, 2009, pp. 494-499.

Tanaseichuk, et al., "An Efficient Hierarchical Clustering Algorithm for Large Datasets", In Austin Journal of Proteomics, Bioinformatics, vol. 2, Issue 1, Feb. 25, 2015, pp. 1-6.

Torres, et al., "Introducing Low-latency Continuous Processing Mode in Structured Streaming in Apache Spark 2.3", Retrieved from: https://www.databricks.com/blog/2018/03/20/low-latency-continuous-processing-mode-in-structured-streaming-in-apache-spark-2-3-0.html, Mar. 20, 2018, 9 Pages.

Vasters, Clemens, "Events, Data Points, and Messages—Choosing the right Azure Messaging Service for your Data", https://azure.microsoft.com/en-US/blog/events-data-points-and-messages-choosing-the-right-azure-messaging-service-for-your-data/, Sep. 12, 2017, 10 Pages.

Mrtanen, et al., "SciPy 1.0: Fundamental Algorithms for Scientific Computing in Python", In Journal of Nature Methods, vol. 17, Issue 3, Mar. 2020, pp. 261-272.

Wang, et al., "Name Disambiguation Using Atomic Clusters", In Proceedings of The Ninth International Conference on Web-Age Information Management, Jul. 20, 2008, pp. 357-364.

Wang, et al., "PACK: An Efficient Partition-Based Distributed Agglomerative Hierarchical Clustering Algorithm for Deduplication", In Proceedings of the VLDB Endowment, vol. 15, Issue 6, Feb. 1, 2022, pp. 1132-1145.

Wu, et al., "An Interactive Clustering-based Approach to Integrating Source Query Interfaces on the Deep Web", In Proceedings of the ACM SIGKDD international conference on Management of Data, Jun. 13, 2004, 12 Pages.

Wu, et al., "Efficient Parallel Algorithms for Hierarchical Clustering on Arrays with Reconfigurable Optical Buses", In Journal of Parallel and Distributed Computing, vol. 60, Issue 9, Sep. 1, 2000, pp. 1137-1153.

Yin, et al., "Local Higher-Order Graph Clustering", In Proceedings of the 23rd ACM SIGKDD International Conference on Knowledge Discovery and Data Mining, Aug. 13, 2017, pp. 555-564.

Zappala, et al., "Asteroid Families. I. Identification by Hierarchical Clustering and Reliability Assessment", In The Astronomical Journal, vol. 100, Issue 6, Dec. 1990, pp. 2030-2046.

Anderberg, Michael R. , "Cluster Analysis for Applications: Probability and Mathematical Statistics: A Series of Monographs and Textbooks", In Publications of Academic Press, May 10, 2014.

* cited by examiner

FIG. 6A

```
Input: Cluster graph G = (C, W); Threshold θ
Output: Clusters C*                                                  600
1  while there exists dist(C_i, C_j) ≤ θ do
2  |    P ⇐ Partition(G)                    // Algorithm 620 or 630
3  |    C' ⇐ {LocalCluster(p)|p ∈ P}        // Algorithm 610
4  |    C ⇐ Integrate C'
5  |    W ⇐ Merge weights based on C
6  C* ⇐ C
```

FIG. 6B

```
Input: Single partition P_h = (𝒞_h, {ℒ(C_i)|C_i ∈ 𝒞_h}); Threshold θ
Output: Clusters C_out
/* Compute in memory                                                  */
1  G ⇐ Build a graph from P_h
2  for C_i ∈ C do
3  |    NN(C_i) ⇐ Nearest neighbor of C_i whose upper bound is
   |       smaller than others' lower bound
4  while true do
5  |    if ∃(C_i, C_j) : (NN(C_i) = C_j) ∧ (NN(C_j) =
   |       C_i) ∧ (b_U(C_i, C_j) ≤ θ) then
6  |    |    Merge C_i with C_j, and update G and NN(·)
7  |    else
8  |    |    break
9  C_out ⇐ Merged clusters in G                                       610
```

FIG. 6C

Input: Cluster graph $G = (C, W)$; Bivariate distance function $dist(\cdot, \cdot)$
Output: Partitions $P$
/* Compute in parallel                                          */
1  foreach $C_x \in C$ do
2  $\quad C_y \Leftarrow$ the 2nd nearest neighbor of $C_x$
3  $\quad r(C_x) \Leftarrow 10 \cdot dist(C_x, C_y)$
4  $Hub \Leftarrow \{C_h | C_h$ has a *mutual* nearest neighbor $C'_h$ and $label(C_h) < label(C'_h)\}$
5  foreach $C_h \in Hub$ do
6  $\quad Neighbor(C_h) \Leftarrow \{C_h\} \cup \{C_x | w(C_h, C_x) \in W\}$
7  $\quad r_{hub}(C_h) \Leftarrow \max\limits_{\substack{C_x \in Neighbor(C_h) \\ \& dist(C_h, C_x) \leq r(C_x)}} (r(C_x) + dist(C_x, C_h))$
8  foreach $C_h \in Hub$ do
9  $\quad \mathscr{C}_h \Leftarrow \{C_h\} \cup \{C_x | w(C_h, C_x) \in W \ \& \ dist(C_h, C_x) \leq r_{hub}(C_h)\}$
10 $\quad$ foreach $C_x \in \mathscr{C}_h$ do
11 $\quad\quad \mathcal{L}(C_x) \Leftarrow \{w(C_y, C_x) | dist(C_x, C_y) \leq r_{hub}(C_h)\} \cup \{$wildcard edge for $C_x\}$
12 $\quad P_h \Leftarrow (\mathscr{C}_h, \{\mathcal{L}(C_x) | C_x \in \mathscr{C}_h\})$
    // Each partition $P_h$ is a tuple of cluster set and edge list set
13 $P \Leftarrow \{P_h | C_h \in Hub\}$

Input: Cluster graph $G = (C, W)$; Bivariate distance function $dist(\cdot, \cdot)$; Neighbor limit $k_N$; Edge list limit $k_L$
Output: Partitions $P$
/* Compute in parallel                                          */
1  $Hub \Leftarrow \{C_h | C_h$ has a *mutual* nearest neighbor $C'_h$ and $label(C_h) < label(C'_h)\}$
2  foreach $C_h \in Hub$ do
3  $\quad \mathscr{C}_h \Leftarrow \{C_h\} \cup \{$top $k_N$ neighbors in $W\}$
4  $\quad$ foreach $C_x \in \mathscr{C}_h$ do
5  $\quad\quad \mathcal{L}(C_x) \Leftarrow \{$top $k_L$ neighbors' weights in $W\} \cup \{$wildcard edge for $C_x\}$
6  $\quad P_h \Leftarrow (\mathscr{C}_h, \{\mathcal{L}(C_x) | C_x \in \mathscr{C}_h\})$
    // Each partition $P_h$ is a tuple of cluster set and edge list set
7  $P \Leftarrow \{P_h | C_h \in Hub\}$

630

FIG. 7
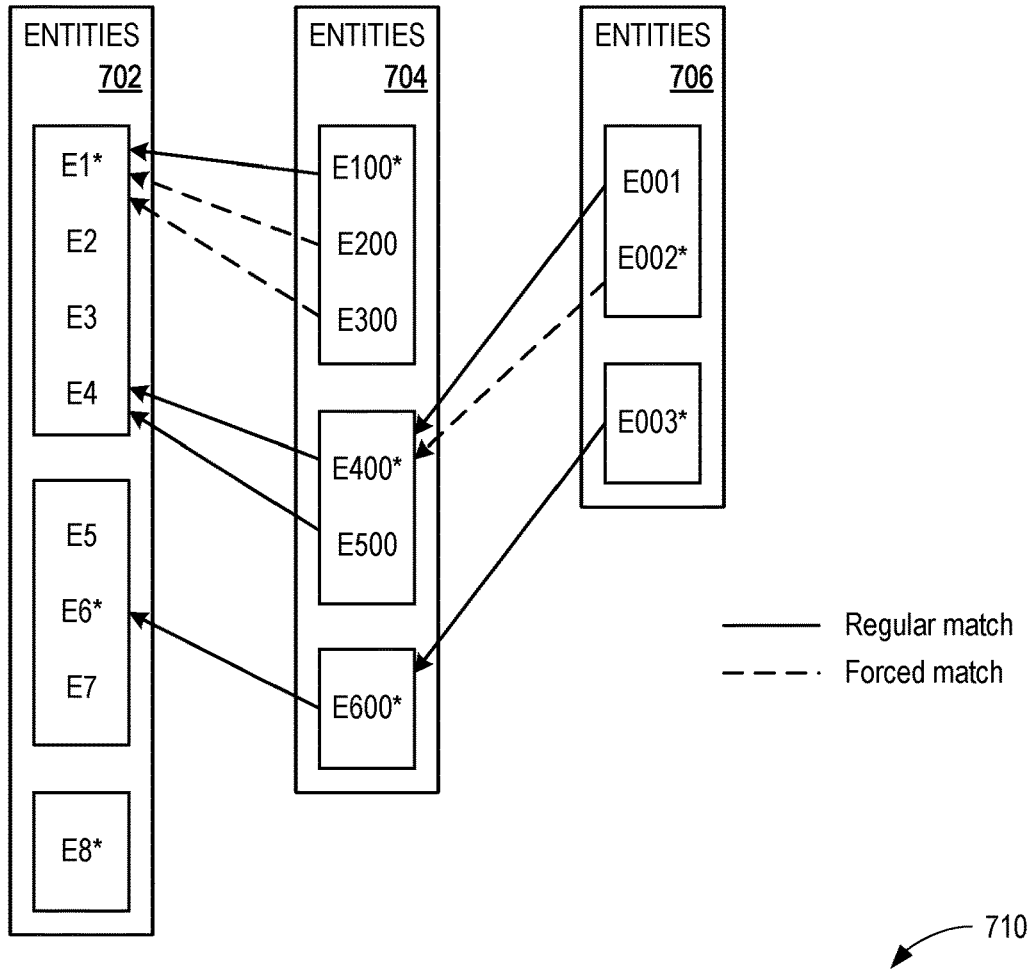
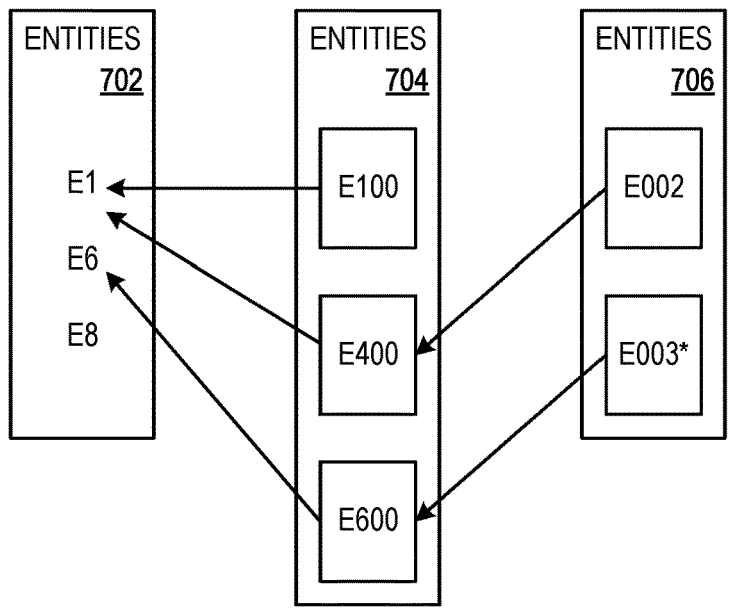

DATA UNIFICATION

CROSS-REFERENCE TO RELATED APPLICATION

This application is a continuation application of and claims priority to U.S. patent application Ser. No. 17/490,908, entitled "DATA UNIFICATION," filed on Sep. 30, 2021, the disclosure of which is incorporated herein by reference in its entirety.

BACKGROUND

A customer data platform (CDP) aggregates data from multiple data sources to create a single customer profile that is accessible to other systems. Data unification is a process used by CDPs to pull data records from various data sources (and/or collected at different times) and cleans, de-duplicates, and combines the data into unified customer profiles that are output as unified records. Data unification is typically performed as a batch service, due to long run times.

Customer profiles, stored as data records, may often rapidly build up duplicates with differences, for the same data subject (e.g., a customer). This may occur when a customer provides information during a sales transaction, and the information collected is stored as a new data record. This new data record may have different information than a prior-existing data record having substantially the same information for a myriad of reasons, such as the data subject moved and has new address, multiple people in a single household share the same physical or email address, a person moves into or out of a household, or the data subject failed to provide information that had been provided earlier.

A common way to reference data records is using a primary key. The primary key for a data record should be unique, to avoid confusing the subjects (e.g., customers) of different records, and should also remain constant, so that downstream systems that use the data record are able to recognize it properly. A common way to automatically generate unique primary keys on systems holding millions or even billions of records, with a low probability of a collision, is to apply a one-way function (e.g., a hash function) to the contents of the record. Unfortunately however, even small inconsequential changes to a record, which may occur in many scenarios, will result in a change to the primary key.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Solutions for data unification include: receiving a data record, the data record comprising a plurality of data fields; selecting, from among the plurality of data fields, a subset of the data fields, the subset of the data fields being fewer in number than the plurality of data fields, wherein selecting the subset of the data fields comprises: applying a first rule to select at least a first one of the data fields within the data record for inclusion in the subset of the data fields; using content of the subset of the data fields, generating a stable identifier (stableID) for the data record; and inserting the stableID into a primary key data field of the data record.

Solutions for data unification include: receiving a first plurality of data records, each data record of the first plurality of data records comprising a plurality of data fields; selecting, from among the first plurality of data records, a primary data record, wherein selecting the primary data record comprises: applying a first policy for selecting from among data records; selecting, from among corresponding data fields in the data records of the first plurality of data records, a primary data field, wherein selecting the primary data field comprises: applying a second policy for selecting from among data fields or groups of data fields; and replacing content of a data field in the primary data record, which corresponds with the primary data field, with content of the primary data field to produce a unified data record.

BRIEF DESCRIPTION OF THE DRAWINGS

The disclosed examples are described in detail below with reference to the accompanying drawing figures listed below:

FIGS. 6A-6D are pseudo-code for algorithms that may be used in the improved self-conflation process of FIG. 5B;

FIG. 7 shows other graphical depictions of self-conflation that may be performed by the arrangement of FIG. 1;

Corresponding reference characters indicate corresponding parts throughout the drawings.

DETAILED DESCRIPTION

Figure 1:
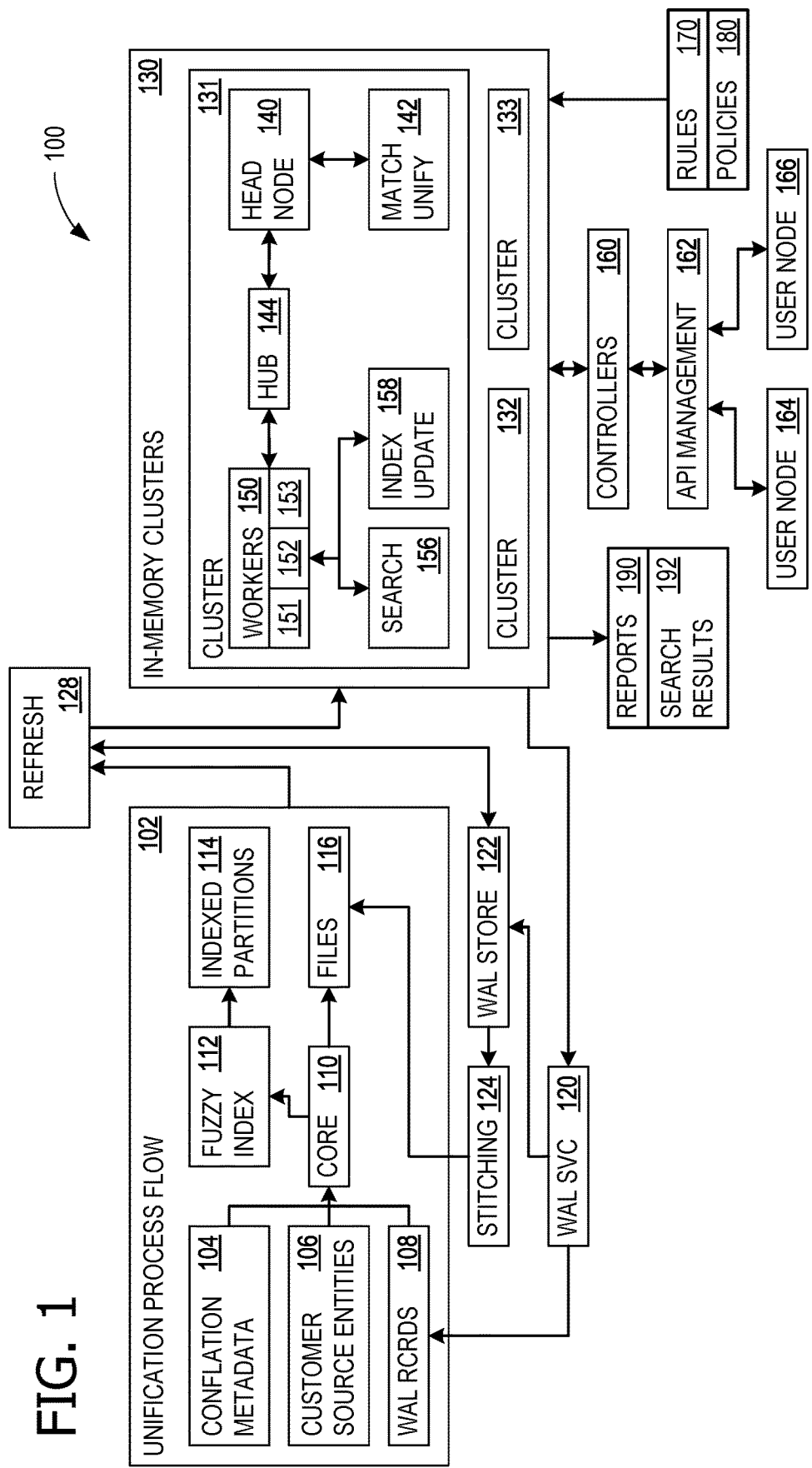
FIG. 1 illustrates an arrangement for advantageously performing improved data unification in a scalable real-time transaction data store.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the disclosure provide for a scalable real-time transaction data store with support for data unification and fuzzy match capability. Solutions for data unification include: receiving a data record, the data record comprising a plurality of data fields; selecting, from among the plurality of data fields, a subset of the data fields, the subset of the data fields being fewer in number than the plurality of data fields, wherein selecting the subset of the data fields comprises: applying a first rule to select at least a first one of the data fields within the data record for inclusion in the subset of the data fields; using content of the subset of the data fields, generating a stable identifier (stableID) for the data record; and inserting the stableID into a primary key data field of the data record.

Aspects of the disclosure improve the operations of computing devices by providing unique primary keys (used for locating data records) with beneficial properties for large-scale data record management operations, when the number of data records is so large that many aspects of the management processes must be automated. The beneficial properties are low likelihood of duplication (e.g., low probability of collision), enabled by performing a one-way operation (e.g., a hash function) on the data record content—even while remaining consistent despite minor changes to data record content. Aspects of the disclosure operate in an unconventional manner by selecting a subset of the data fields (fewer than all of the data fields) and generating a stable identifier (primary key) for the data record using content of the subset of the data fields.

In some examples, a user interface (UI) is provided for receiving user input to control or override default algorithm selections, based on the premise that customer data platform (CDP) users are typically sophisticated data consumers and have a high degree of familiarity with the characteristics of their data. During data unification, whether full or incremental, identifiers for data records should survive refreshes when there is no significant change to the content. Stability is important to downstream applications such as profile store ingestion, measures, and intelligence. Users are thus able to select "sticky fields" that are unlikely to change, such as identifiers from their data sources, and which the users believe to be trustworthy and stable.

Additional solutions for data unification include: receiving a first plurality of data records, each data record of the first plurality of data records comprising a plurality of data fields; selecting, from among the first plurality of data records, a primary data record, wherein selecting the primary data record comprises: applying a first policy for selecting from among data records; selecting, from among corresponding data fields in the data records of the first plurality of data records, a primary data field, wherein selecting the primary data field comprises: applying a second policy for selecting from among data fields or groups of data fields; and replacing content of a data field in the primary data record, which corresponds with the primary data field, with content of the primary data field to produce a unified data record.

Aspects of the disclosure thus also improve accuracy of computing operations by selecting a primary data record (from a plurality of data records during data unification), selecting a primary data field from among corresponding data fields in data records of a plurality of data records, and replacing content of a data field in the primary data record with content of the primary data field to produce a unified data record. This enables the unified data record to have the most accurate or timely information from among multiple duplicate records (e.g., some data field content in the selected primary data record is replaced by selected content from a different data record).

Further solutions for data unification include: indexing data structures according to a conflation plan; co-locating a first set of data records of a plurality of data records in a first node of a distributed network, each data record in the first set of data records having a stableID, wherein two or more of the stableIDs for the first set of data records are identified as expected to be searched together; and co-locating a second set of data records of the plurality of data records in a second node of the distributed network, each data record in the second set of data records having a stableID, wherein two or more of the stableIDs for the second set of data records are identified as expected to be searched together, and wherein the two or more of the stableIDs for the first set of data records are identified as expected to not be searched together with the two or more of the stableIDs for the second set of data records.

These further aspects of the disclosure operate in an unconventional manner by co-locating sets of data records in a distributed network, based on whether data records are identified as expected to be searched together, thereby improving the speed of computing operations for large-scale data record management operations. This enables data unification (e.g., customer profile unification and data unification in other fields) in near real time and also allows searching on available profiles including both source profiles and unified profiles, simultaneously.

FIG. 1 illustrates an arrangement 100 that provides a scalable real-time transaction data store with support for improved data unification (e.g., map, match, merge) and fuzzy match capability. Using arrangement 100, the indexing strategy of the data structures and partitioning strategy for a distributed database using a stableID (as described below) speeds up data unification and searching to real-time. Another notable aspect is the selection of a final record (e.g., a winner record)—and yet using data fields from non-winner records, when their data fields are more valid (e.g., more complete or having a higher validity score) or more time-favorable (e.g., older or newer, based on the nature of the data).

In a CDP, customer records may be matched from two or more different entities to create unified profiles and/or customer profiles from a single entity may be de-duped (de-duplicated) to create unified profiles. In some examples, each of the entity that undergoes cross-entity matching also undergoes self-conflation. After individual entities complete self-conflation, users may select that either the winner from each cluster in self-conflation participates in cross-entity matching, or all records (both winner and non-winner) participate in cross-entity matching.

A unification process flow 102 has conflation metadata 104 customer source entities 106, and write ahead log (WAL) records 108 that feed into a core 110 (e.g., a map-reduce orchestration core). The output of core 110 is fed into a fuzzy index builder service 112, and separated into indexed partitions 114. Additionally, files 116 are output from core into a data lake for backwards compatibility and downstream consumptions. Core 110 performs mapping and implements a user-defined conflation plan, and implements merge policies. A fuzzy index refresh service 128 loads the index into indexed partitions 114 into in-memory clusters 130. Fuzzy index refresh service 128 additionally replays pending updates from WAL store 122, and also refreshes when there are changes to conflation metadata 104. The fuzzy index is tailored for unification and search.

In-memory clusters 130 is shown as comprising three clusters, cluster 131, cluster 132, and cluster 133. In some examples, a different number of clusters are used. In some examples, each of clusters 131-133 is configured similarly. Cluster 131 has a head node 140 that manages workload (e.g., search queries) for worker nodes 150, which includes worker node 151, worker node 152, and worker node 153, through a hub 144. Worker nodes 150 search data records using a search service 156 and an index update service 158 sends updates to worker nodes 150. Index updates and updated records are persisted. Head node 140 runs through a conflation plan using a match and unify service 142 to produce a final set of records.

The records are sent from cluster 131 to a WAL service 120 updating WAL records 108, customer source entities 106, and conflation metadata 104. Changes to conflation metadata 104 triggers a rebuild of indexed partitions 114. WAL service 120 also forwards records for storage in a WAL store 122. A stitching service 124 writes from WAL store 122 into files 116. Activities between WAL service 120 and fuzzy index refresh service 128 are run in batch mode, in some examples, whereas the WAL store 122 and activities within in-memory clusters operate in real-time (e.g., approximately 500 milliseconds or less). As real-time updates arrive, they are retained in an in-memory cache and write-ahead updates are processed in real-time, with the expectation that a refresh schedule will process them to provide a proper re-index, re-partition, and re-fresh of the in-memory cache (e.g., in cluster 131).

A set of controllers 160 and API management 162 provide access to customers via a user node 164 and a user node 166. In some examples both a search API that enables fuzzy search against source entities and a unify API that enables match and merge. Customers are able to input rules 170, used for generating a stableID (described below, in relation to FIGS. 11 and 12), and policies 180, used for managing self-conflation. Reports 190 include statistics regarding stableID generation and conflation results, which may be used in assisting a customer with selecting rules 170 and policies 180. Additionally, user nodes 164 and 166 are used to request searches and data unification, and search results 192 are provided to user nodes 164 and 166. In some examples, users provide data for insertion, updates, and deletion requests for customer source entities 106, which are reflected in the in-memory clusters 130 in real-time. Rules 170 are used to represent a selection capability, and may be more complex than merely a set of criteria or decision factors. In some examples, rules 170 represent a full ML-based decision framework.

Figure 2:
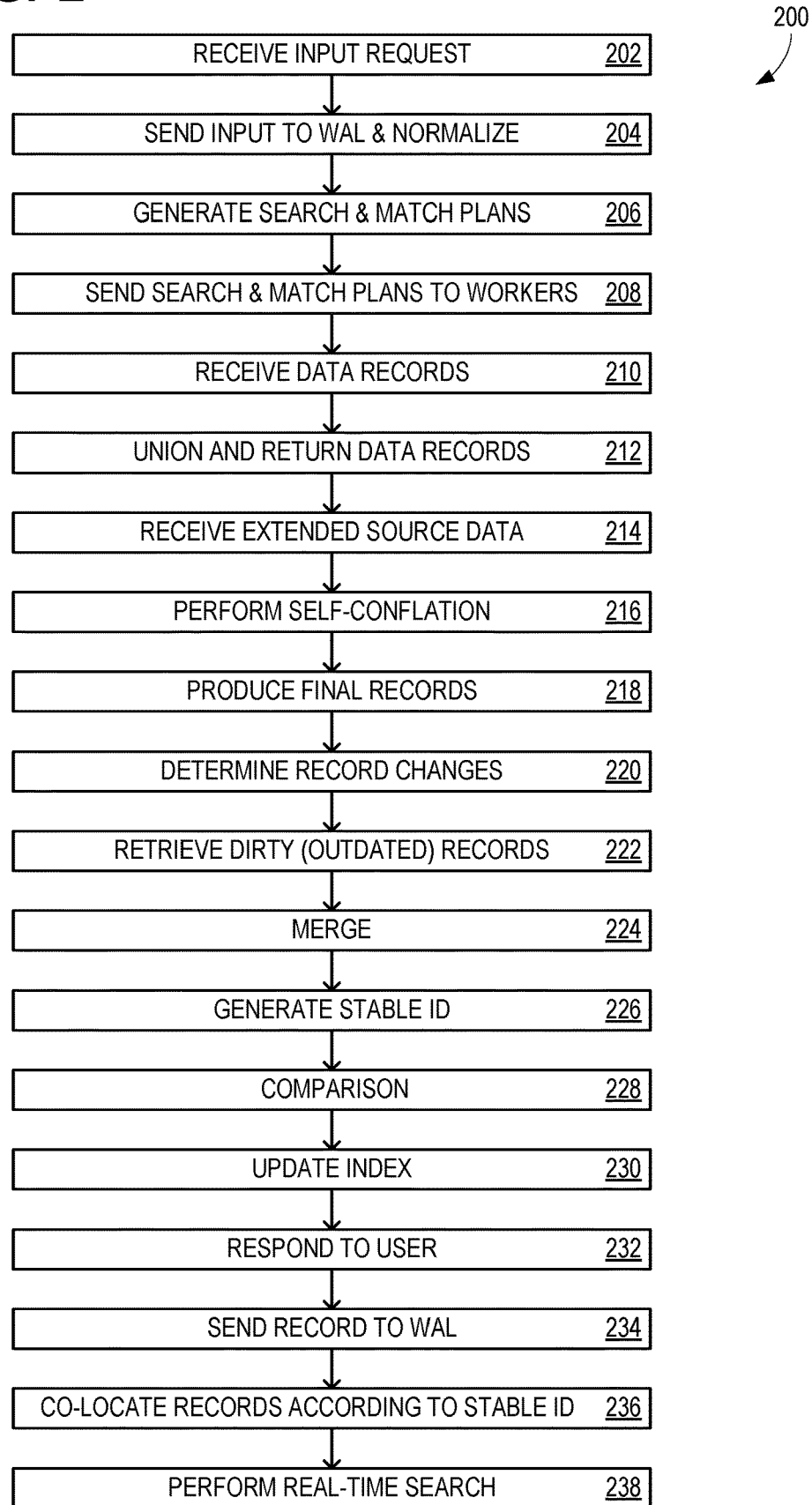
FIG. 2 a flowchart illustrating exemplary operations that may performed by the arrangement of FIG. 1.

FIG. 2 a flowchart 200 illustrating exemplary data unification and other operations that may be performed by arrangement 100. At 202, a request (e.g. inputting a new data record) is received at 202 from user node 164 or 166, and is sent to WAL service 120 as a commit request and normalized at 204. At 206, given the specified table columns and a conflation plan, a search plan and a match plan are generated. The search plan and the input record (received at 202) are sent to a worker node (e.g., worker node 151) at 208. CMP records are received from worker nodes 150 at 210, which are unioned and returned to worker nodes 150 at 212. At 214, extended source data is received from worker nodes 150.

The extended source data is self-conflated and normalized at 216. Self-conflation is described in further detail below, for example in relation to FIG. 9. When searching, the requested record is normalized (e.g., semantic normalization and converting digits to ASCII representation), but for self-conflation is performed prior to normalization. Operation 218 produces a new set of records by iterating through the match plan against candidate records, and operation 220 compares final records to records from operation 208 to determine changes (e.g., updated, deleted, and new records). New data rows are sent back to worker nodes 150 to retrieve dirty (e.g., outdated) records.

A merge process is run, as operation 224, with the dirty and updated source records. A stableID (e.g., stableID 1150 of FIG. 11) is generated in operation 228 and used for the merged records. A comparison is made at 228 between the results of operations 224 and 218, to determine insertions, updates, and deletions. This information is sent to worker nodes 150 for updating the index and saving data partitions at 230. Both the updated CMP and customer records, as well as the source record from the request (at 202) are sent and updated. Operation 230 includes indexing data structures according to a conflation plan. The data structures are used in real time unification design which enables fuzzy search (e.g., the data structures support fuzzy matching).

An index is built (e.g., by fuzzy index builder service 112) for each partition of indexed partitions 114, and each index is based on a mapping of a signature (e.g., based on a hash) to a record identifier. Building an index per partition supports scaling. For example, when an index is computed per-partition, data queries may be handled in parallel per-partition. This indexing and partitioning strategy effectively distributes the load for multiple concurrent requests to query the data, reducing latency to real-time performance.

In some examples, data structures similar to those shown in Table 1 are used in the indices:

| Name | Per Partition? | Key Type | Value Type | Description |
|---|---|---|---|---|
| IndexMetadata | Broadcast | string | string | List of total fuzzy indexes |
| Reference ColumnToken Weights | Broadcast | Long (tokenId) | Short (tokenWeight), String (token) | List of token IDs for each of the indexed columns along with their Weights and Token String. 1 copy per column. |
| Reference ColumnToken Ids | Broadcast | String (token) | Long (tokenId), Short (tokenWeight) | Reverse lookup of token strings to Token ID and weights for each of the column. 1 copy per column. |
| Tokenized ReferenceTable | Per-Index | Long (recordId) | List<long> (list of tokenIds) | Mapping of RecordID to list of Tokens from the record |

-continued

| Name | Per Partition? | Key Type | Value Type | Description |
|---|---|---|---|---|
| Signature Dictionary | Per-Index | Int (signature) | HashSet<long> (recordId list) | Mapping of each signature to all record IDs that share the same signature |
| Reference ColumnToken Ngrams | Per-Index | String (n gram) | Hashet<long> (tokenId) | Mapping of n-grams to their corresponding tokens where it is derived from. 1 copy per column. |

At 232, a response is sent back to user node 164 or 166 (whichever sent the initial request at 202). The response (CMP) and the input source record are sent to WAL service 120 as a data commit at 234. Operation 236 includes co-locating data records (of a plurality of data records) in a common node of a distributed network (e.g., in-memory clusters 130), each data record having a stableID, wherein two or more of the stableIDs for a co-located set of data records are identified as expected to be searched together. This co-location of data records that a user is likely to search together (leveraging stableIDs for record identification), permits real-time searching in operation 238.

Searching in operation 238 may include receiving a request at head node 140, which is forwarded to worker nodes 150. Operation 238 may be invoked at any time, and is not limited to following operation 236. Each worker node 151, 152, and 153 uses their local index to run a fuzzy search, to identify local candidate records. Candidate record identifications are checked against data partitions (e.g., indexed partitions 114) to find the data records. The data records are sent to head node 140, which runs a map, match, merge algorithm. Matches are sent back to worker nodes 150 for updating CMP data and the index, and results are returned to the user node that requested the search.

Figure 3:
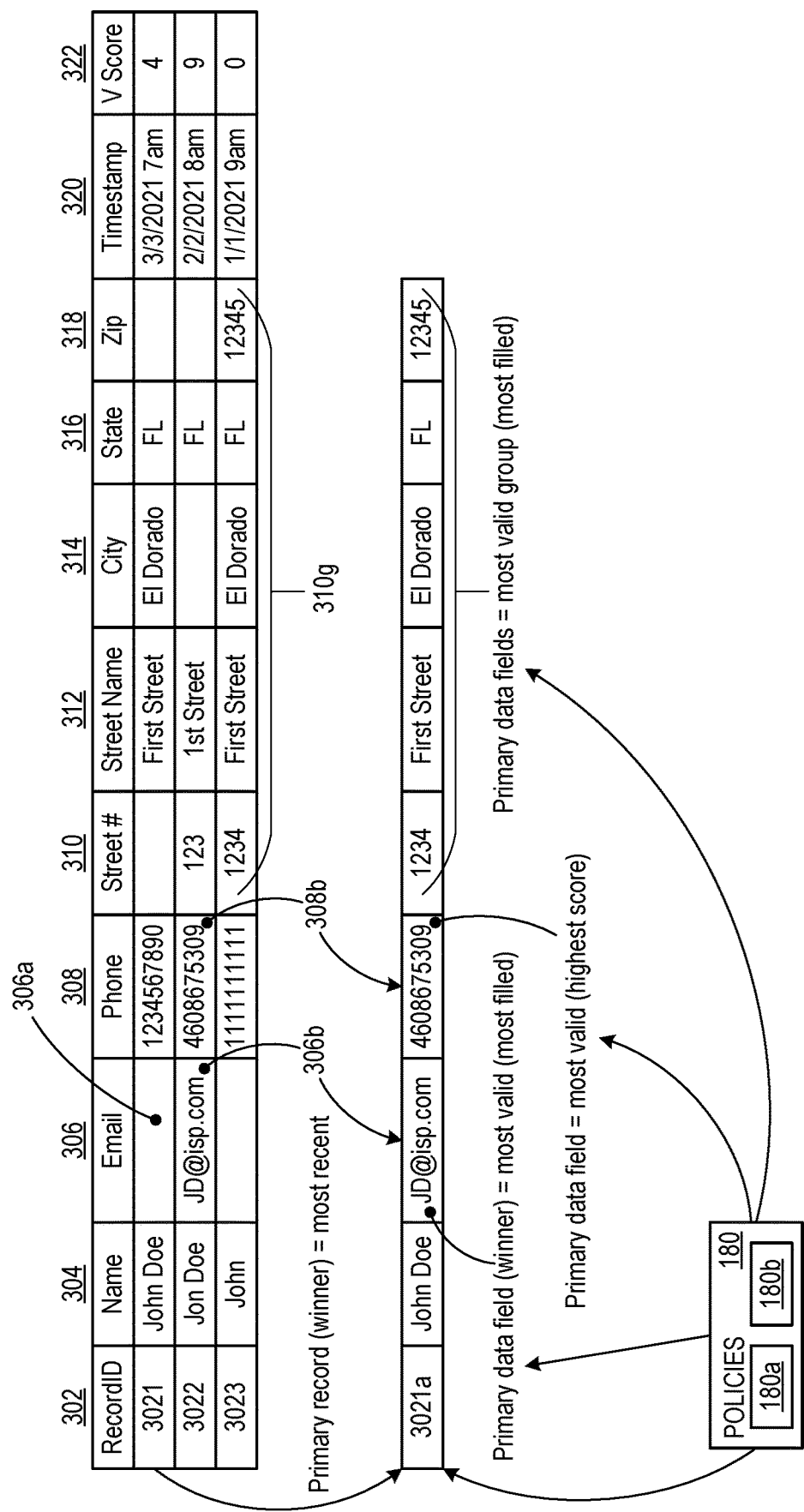
FIG. 3 illustrates the generation of a unified data record from a plurality of data records, as may occur in the arrangement of FIG. 1.

FIG. 3 illustrates the generation of a unified data record 3021*a* from a plurality of data records 3021, 3022, and 3023. As illustrated there are multiple example data fields 302-322. Data field 302 is the record ID, data field 304 is a name (e.g., a customer name as may be seen in a CDP), data field 306 is an email address, and data field 308 is a phone number. Data fields 310-318 are an address group. Data field 310 is a house number, data field 312 is a street name, data field 314 is a city name, data field 316 is a state, and data field 318 is a zip code. Data field 320 is a timestamp for the record and data field 322 is a validity score.

As indicated, data record 3021 is the oldest and data record 3023 is the most recent (newest). Data record 3022 has the phone number with the highest validity score of 9, in data field 308*b* (308*b* being the data field in data record 3022 that corresponds to phone number data field 308). The phone number 1234567890 in data record 3021 has a validity score (see data field 322), because it appears contrived. The phone number in data record 3023, which is all 1's, is clearly invalid and so has a validity score of 0. Data field 306*a* is empty, while data field 306*b* has an email address (306*a* and 306*b* being the data fields in data records 3021 and 3022, respectively, that corresponds to email data field 308).

A policy 180*a*, in policies 180, selects data record 3021 as a primary data record 3021 (e.g., a winner record), applying a policy that favors the most recent data record. Other policies may instead be used, such as the oldest or the most-filled (most complete) data record, or the most valid according to some scoring algorithm. A policy 180*b*, in policies 180, selects data field 306*b* in data record 3022, which was not selected as the primary data record), as a primary data field to over-write the contents of the data field in primary data record 3021 that corresponds to data field 306, applying a policy that favors the most filled data field as being the most valid.

Another policy in policies 180 selects data field 306*b* in data record 3022, applying a policy that favors the highest validity score, as a primary data field to over-write the contents of the data field in primary data record 3021 that corresponds to data field 308. Another policy in policies 180, for example a group policy, selects a group of data fields 310-318, comprising a data field address group 310*g*, applying a policy that favors the most-filled group as the most valid, to over-write the contents of the data fields in primary data record 3021 that corresponds to data fields 310-318. This produces unified record 3021*a*.

Figure 4:
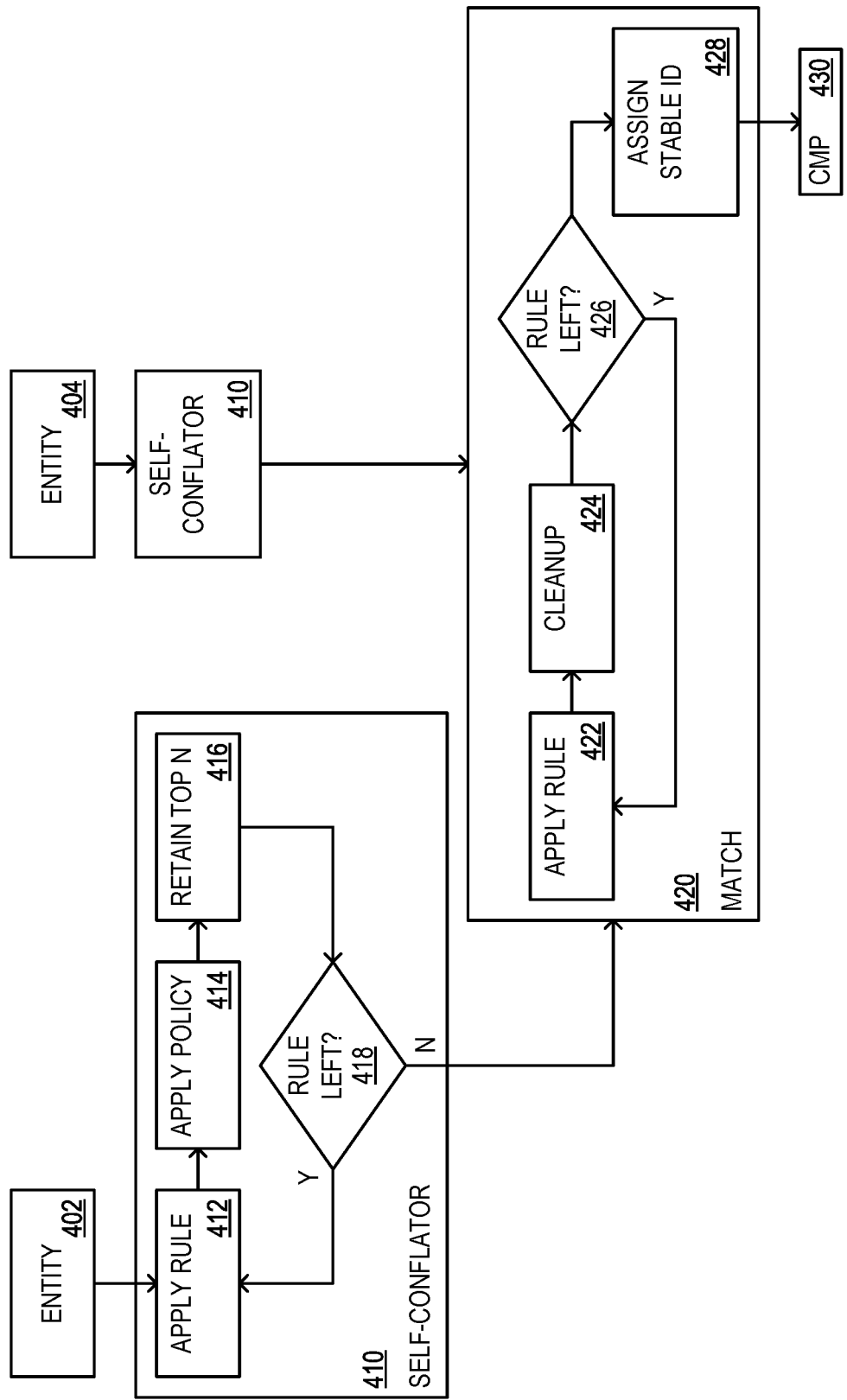
FIG. 4 is another flowchart illustrating exemplary operations that may performed by the arrangement of FIG. 1.

FIG. 4 is a flowchart 400 illustrating exemplary operations that may performed by arrangement 100, for example, updating entities 402 or 404 (e.g., of customer source entities 106). The operations of a self-conflator 410 are illustrated for entity 402; operations performed on entity 404 are similar. Self-conflation removes duplicate data records by finding data records that are likely for the same data subject, but received at different times and/or from different sources. Further detail on self-conflation is provided in relation to FIGS. 5A-6D. A rule is applied at box 412 and a canonical ID is assigned to each record. A row winner policy is applied and a parent ID is assigned at box 414. The top N (count) records are retained within each group at box 416, and unmatched records are passed to a decision 418 that determines whether there are any rules left to apply. If so, the cycle through boxes 412-418. When no rules remain, results are passed to box 420 for matching.

Box 420 receives the outputs of self-conflator 410 for both entity 402 and entity 406. A matching rule is applied at box 422, and cleanup is performed at box 424. While there are more rules left to apply, as determined in decision 426, the process flows through boxes 422 and 424 again. A stableID is generated at box 428 (see FIG. 12) and the result is output to CMP (e.g., in cluster 131 and/or to WAL service 120).

Figure 5A:
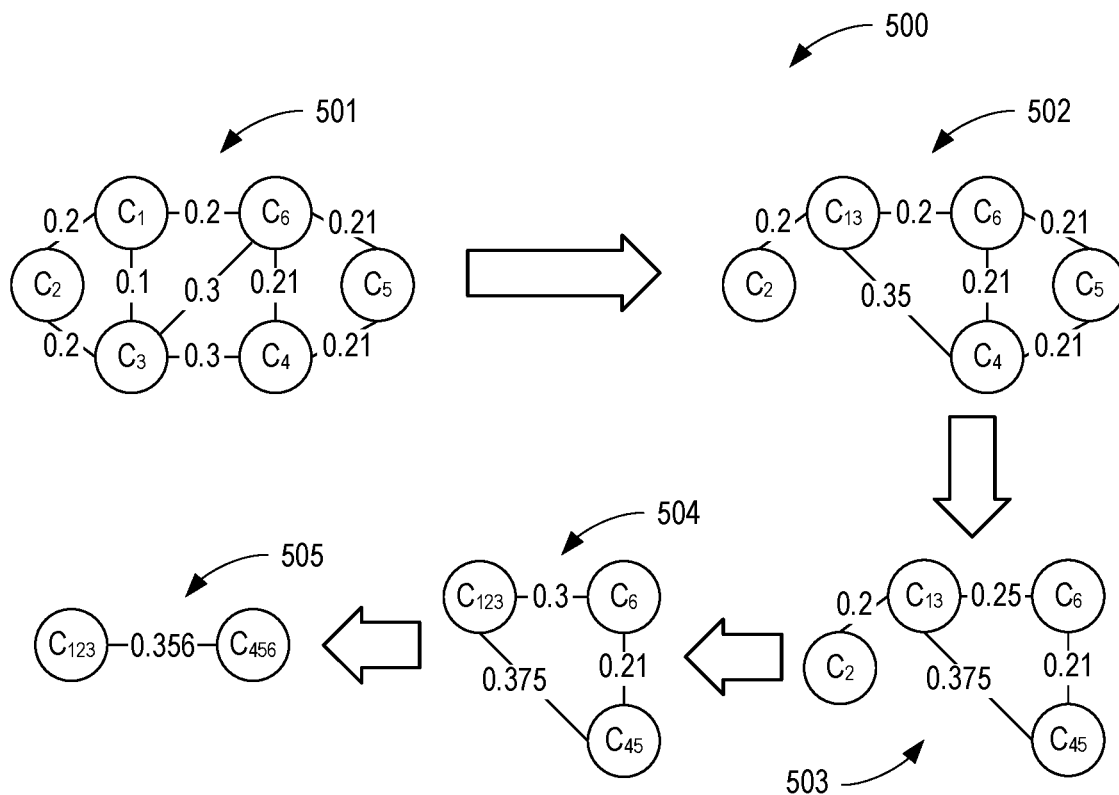
FIG. 5A is a graphical depiction of a self-conflation process.

FIG. 5A is a graphical depiction of a self-conflation process 500 having five stages 501-505. Given an undirected weighted graph G(C,W), where C is a set of items and W is a set of weights indicating the distances between pairs of items in C, and a distance threshold θ>0, Agglomerative Hierarchical Clustering (AHC) algorithm starts by treating each item as a singleton cluster, iteratively merges nearest cluster pairs, and stops when no two clusters are less than distance θ. In FIG. 5, only distances less than 0.4 are shown, and θ is set to 0.3.

Stage 501 shows the initial state, with six nodes. After a first clustering iteration, $C_1$ and $C_3$ are combined into $C_{13}$ at stage 502. A second iteration combines $C_4$ and $C_5$ into $C_{45}$ at stage 503, and a third iteration combines $C_1$ and $C_{13}$ into $C_{123}$ at stage 504. A final iteration combines $C_{45}$ and $C_6$ into $C_{456}$ at stage 505, where the final distance 0.356 is greater than 0.3. Unfortunately, this iterative approach takes time.

Figure 5B:
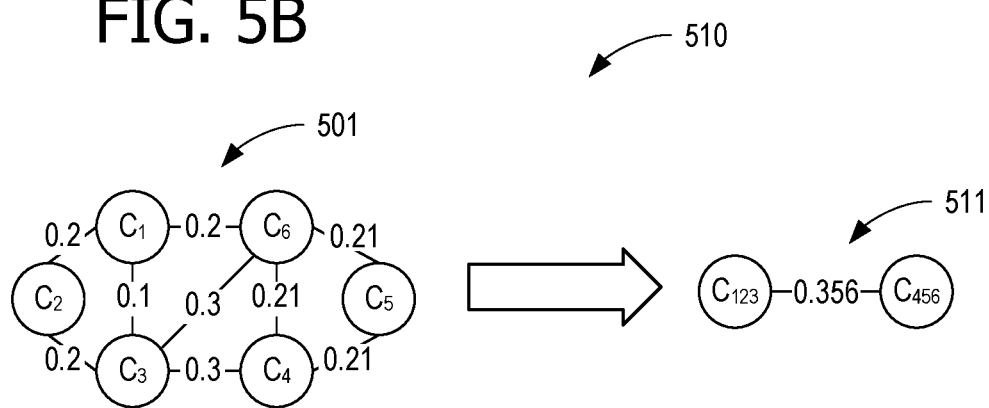
FIG. 5B is a graphical depiction of an improved self-conflation process that may be performed by the arrangement of FIG. 1.

FIG. 5B is a graphical depiction of an improved self-conflation process 510 that may performed by arrangement 100, moving directly from stage 501 to a final stage 511 with a single iteration. Process 510 may be described as a partition-based distributed agglomerative hierarchical clustering with symmetric node collapsing. Process 510 performs in-memory local clustering for each partition, integrates the clustering results, and finally merges weights (i.e. edges) based on the clustering. Similarly to process 500, process 510 stops when no weight is below the distance threshold θ.

Local clustering permits computing clustering in parallel in a distributed setting (e.g., with clusters 131-133 each having their own partition). The partitioning reduces the number of iterations compared to process 500, saving time that would otherwise be used for overhead of the iterations and the shuffle cost of intermediate graph stages. FIGS. 6A-6D are pseudo-code for algorithms that may be used examples of process 510. FIG. 6A shows the top-level algorithm 600 that calls either algorithm 620 (FIG. 6C) or algorithm, 630 (FIG. 6D), and then algorithm 610.

Algorithm 610 is a local partition clustering algorithm. For each cluster $C_i$ in a partition, rather than requiring all edges to be loaded into memory, only its nearest neighbors are required for forming an edge list $L(C_i)$, so that the input data size is reduced. Additionally, each distance is converted from a scalar to a range, so that the edges outside the partition (i.e. $\notin L(C_i)$) may be represented by a wildcard edge indicating the lower bound of their distances to $C_i$.

$L(C_i)$ is defined as the list of nearest neighbors of $C_i$, whose size limit is a configurable parameter. For each $C_j \in L(C_i)$, $b_L(C_i, C_j)$ and $b_U(C_i, C_j)$ are defined as the lower and upper bounds of $dist(C_i, C_j)$, respectively. Initially, when no merges occur, $b_L(C_i, C_j)$ and $b_U(C_i, C_j)$ are each the value of $dist(C_i, C_j)$. In addition to the bounds, a wildcard $C_i^*$ is attached into $L(C_i)$. Its lower bound $b_L(C_i, C_i^*)$ indicates that all remaining neighbors are beyond distance $b_L(C_i, C_i^*)$. Its $(C_i, C_i^*)$ is an application-specific large value (e.g., infinity) indicating the upper bound.

Algorithm 620 is a distance-based algorithm that partitions a graph using hubs and radii. A radius is determined for each cluster $C_x$ that is 10 times the distance between $C_x$ and its second nearest neighbor. This permits merging a larger number of clusters. A hub is a cluster that has a mutual nearest neighbor in G, which will be merged because its radius covers its nearest neighbor. Algorithm 630 partitions with a size limit. Algorithm 630 creates two partitions $P_1$ and $P_4$, which are passed to algorithm 610 to generate $C_{123}$ and $C_{456}$ of FIG. 5B—in a single iteration.

FIG. 7 shows an alternative graphical depiction 700 of self-conflation, as may performed by arrangement 100. Entities 706 has item E001 and item E002 (marked with an asterisk * to indicate that it is the winner or primary item), and item E300 (which is also a winner because it is the only one in its group). Item E001 is a regular match with item E400 in entities 704, and item E002 is a forced match with item E400. Item E003 is a regular match with item E600 in entities 704. In entities 704, item E100 is the winner and has a regular match with item E1 in entities 702. Items E200 and E300 are forced matches with item E1. Item E400 is the winner and has a regular match with item E4 in entities 702. Item E500 has a forced match with item E4. Item E600 has a regular match with item E6 in entities 702. Graphical depiction 710 provides simpler notional view, with the same results.

Figure 8:
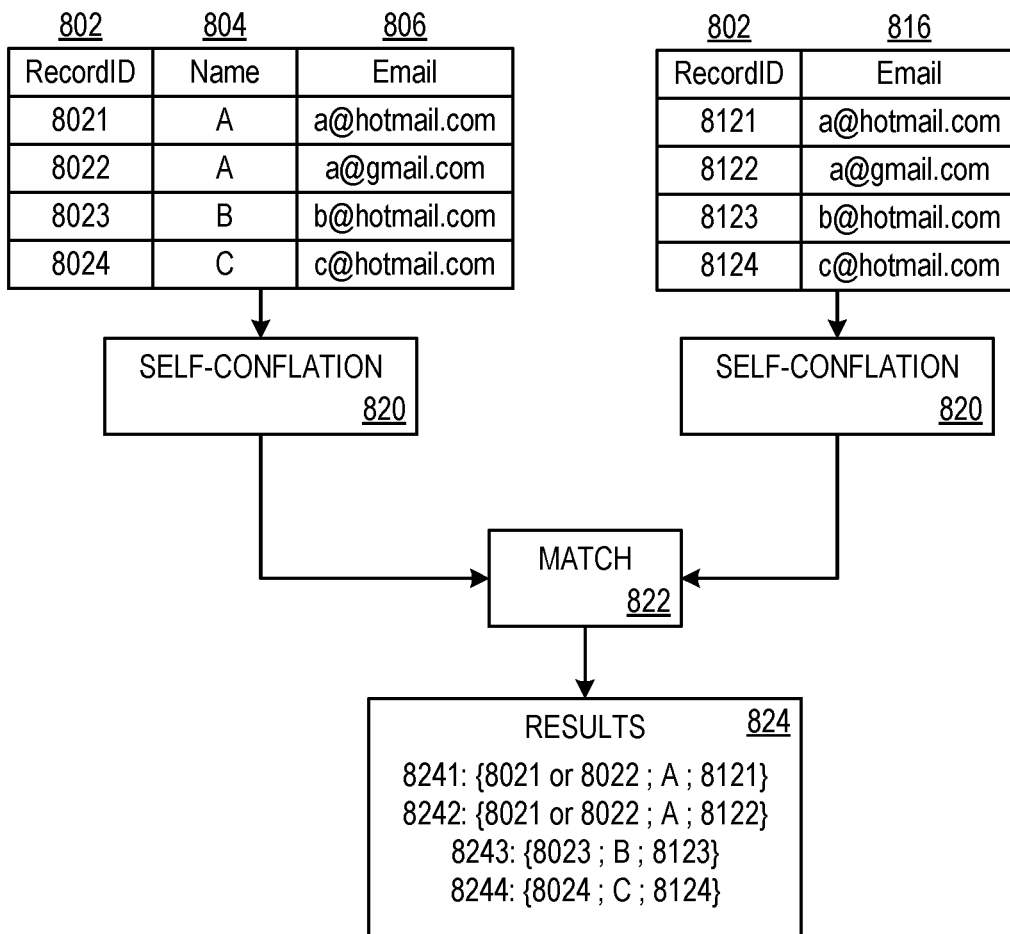
FIG. 8 illustrates exemplary self-conflation results, as may occur in the arrangement of FIG. 1.

FIG. 8 illustrates exemplary self-conflation results 824 in a process 800, as may occur in arrangement 100. Data records 8021-8024 have data fields 802-806 and are passed through self-conflation 820 (see FIG. 9), and data records 8121-8124 have data fields 802 and 816 and are also passed through self-conflation 820. The output results are matched at box 822 to produce results 824.

Data field 802 is the record ID field for each record. Data field 804 is a name field, and data field 806 and data field 816 are each email fields. This arrangement may occur, for example when one data collection system collects both customer names and customer email addresses, and another data collection system collects only customer email addresses. Data record 8021 and data record 8022 have a similar name ("A"), but different email addresses. Data record 8121 and data record 8122 each have an email address that corresponds to those of data records 8021 and 8022, respectively. Data record 8023 and data record 8024 have both different names ("B" versus "c") and different email addresses. Data record 8123 and data record 8124 each have an email address that corresponds to those of data records 8023 and 8024, respectively.

Results 824, sent to a CMP in some examples, have various output possibilities. Output data record 8241 may have a record ID from data record 8021 or 8022, the name "A", and an email address from data record 8121. Output data record 8242 may have a record ID from data record 8021 or 8022, the name "A", and an email address from data record 8122. Output data record 8243 will have the data fields from data record 8023, output data record 8244 will have the data fields from data record 8024.

Figure 9:
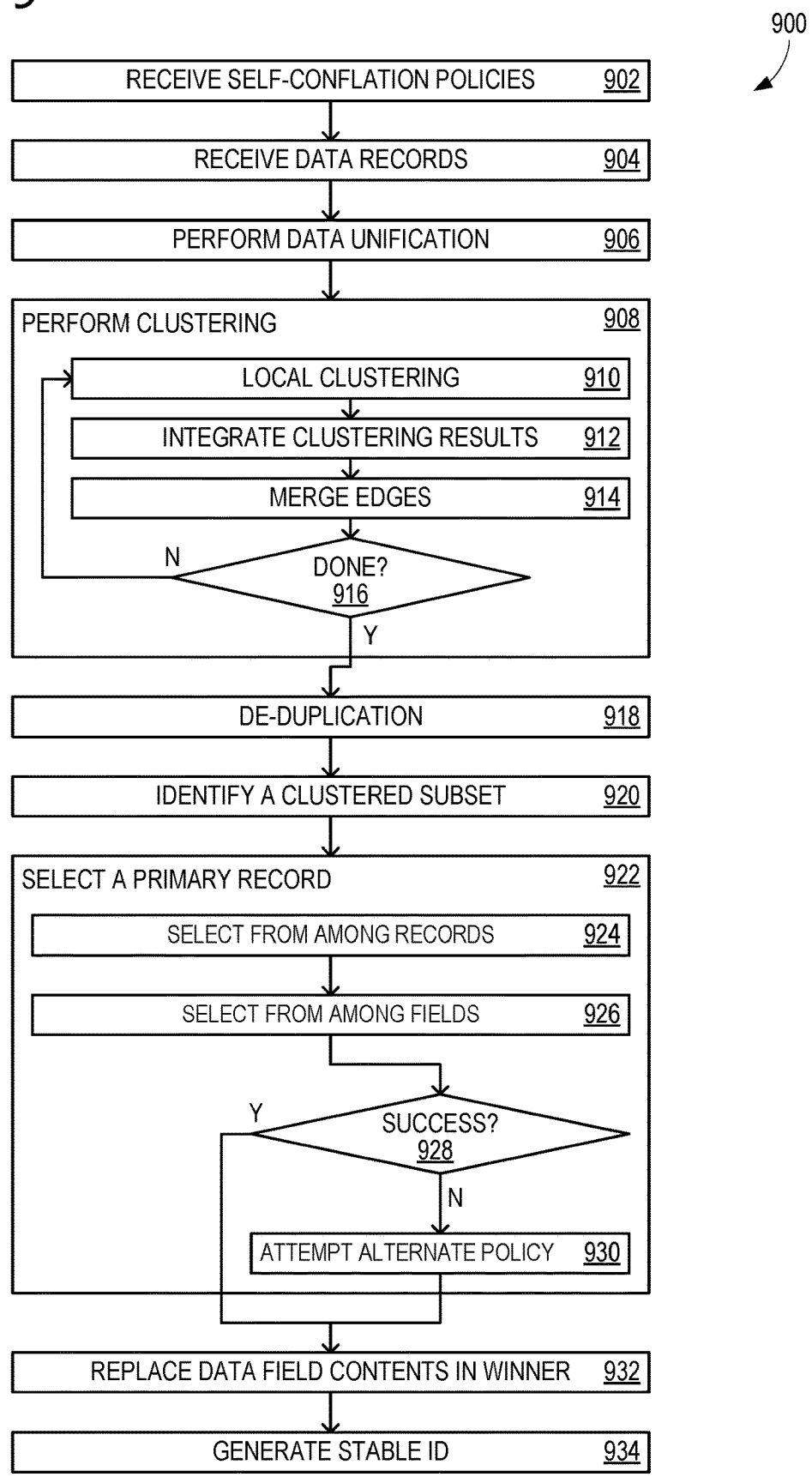
FIG. 9 is another flowchart illustrating exemplary operations that may be performed by the arrangement of FIG. 1.

FIG. 9 is a flowchart 900 illustrating exemplary operations associated with arrangement 100. In some examples, operations described for flowchart 900 are performed by computing device 1500 of FIG. 15. Flowchart 900 commences with operation 902, which includes 902 receiving, from a user input, policy 180a and policy 180b, which will be used to guide self-conflation. Data records are received in operation 904. This includes a larger set, referred to in this description of flowchart 900 as a second plurality of data records. The second plurality of data records includes a first plurality of data records, which will be identified later, in operation 918, and the subject of operations 920-932. Thus, operation 902 includes receiving the first plurality of data records (e.g., data records 3021-3023 or 8021-8124), each data record of the first plurality of data records comprising a plurality of data fields.

Operation 906 performs a data unification process, of which the remainder of flowchart 900 is a portion. The data unification process includes a self-conflation process, which produces a unified data record (e.g., data record 3021a of FIG. 3) from the first plurality of data records. Operation 908 performs clustering of the second plurality of data records, in accordance with the descriptions of FIGS. 5A-6D, using operations 910-916. In some examples, the clustering comprises performing in-memory local clustering for a plurality of partitions. In some examples, the clustering is performed in parallel among distributed compute nodes (e.g., clusters 131, 131, and 133). In some examples, the clustering comprises partition-based distributed agglomerative hierarchical clustering.

Local clustering is performed in operation 910, operation 912 integrates clustering results, and operation 914 merges edges. Operations 910-916 repeat until decision operation 916 determines that all edge weights exceed a distance threshold. De-duplication (de-dupe) is performed in operation 918. Operation 920 identifies the first plurality data records as a clustered subset, less than all, of the second plurality of data records.

Operation 922 selects, from among the first plurality of data records, primary data record 3021, using operations 924-930. Operation 924 includes applying policy 180a for selecting primary data record 3021 from among data records 3021-3023. In some examples, policy 180a is selected from the list consisting of: most recent, least recent, and most valid. In some examples, the most valid policy comprises a most filled policy. In some examples, applying the most valid policy comprises determining a validity score. In some examples, applying the most valid policy comprises selecting the highest validity score.

Operation 926 includes selecting, from among corresponding data fields in the data records of the first plurality of data records, a primary data field (e.g., data field 306b). This may be accomplished by applying policy 180b for selecting from among data fields or groups of data fields. In some examples, policy 180b is selected from the list consisting of: most recent, least recent, and most valid. Decision operation 928 determines whether applying policy 180b is successful or unsuccessful. If unsuccessful, operation 930 includes, based on at least determining that applying policy 180b is unsuccessful, applying a third policy for selecting the primary data field or a primary data field group (e.g., data field address group 310g) from among data fields or groups of data fields.

Operation 932 includes replacing content of a data field (e.g., data field 308) in primary data record 3021, which corresponds with the primary data field, with content of the primary data field to produce unified data record 3021a. Operation 934 includes using content of a subset of data fields of unified data record 3021a to generate a stableID (e.g., stableID 1150 of FIG. 11) for the final data record (e.g., final version of unified data record 3021a). Operation 934 includes inserting the stableID into a primary key data field of unified data record 3021a. Further detail for operation 932 is provides as flowchart 1200 of FIG. 12.

Figure 10:
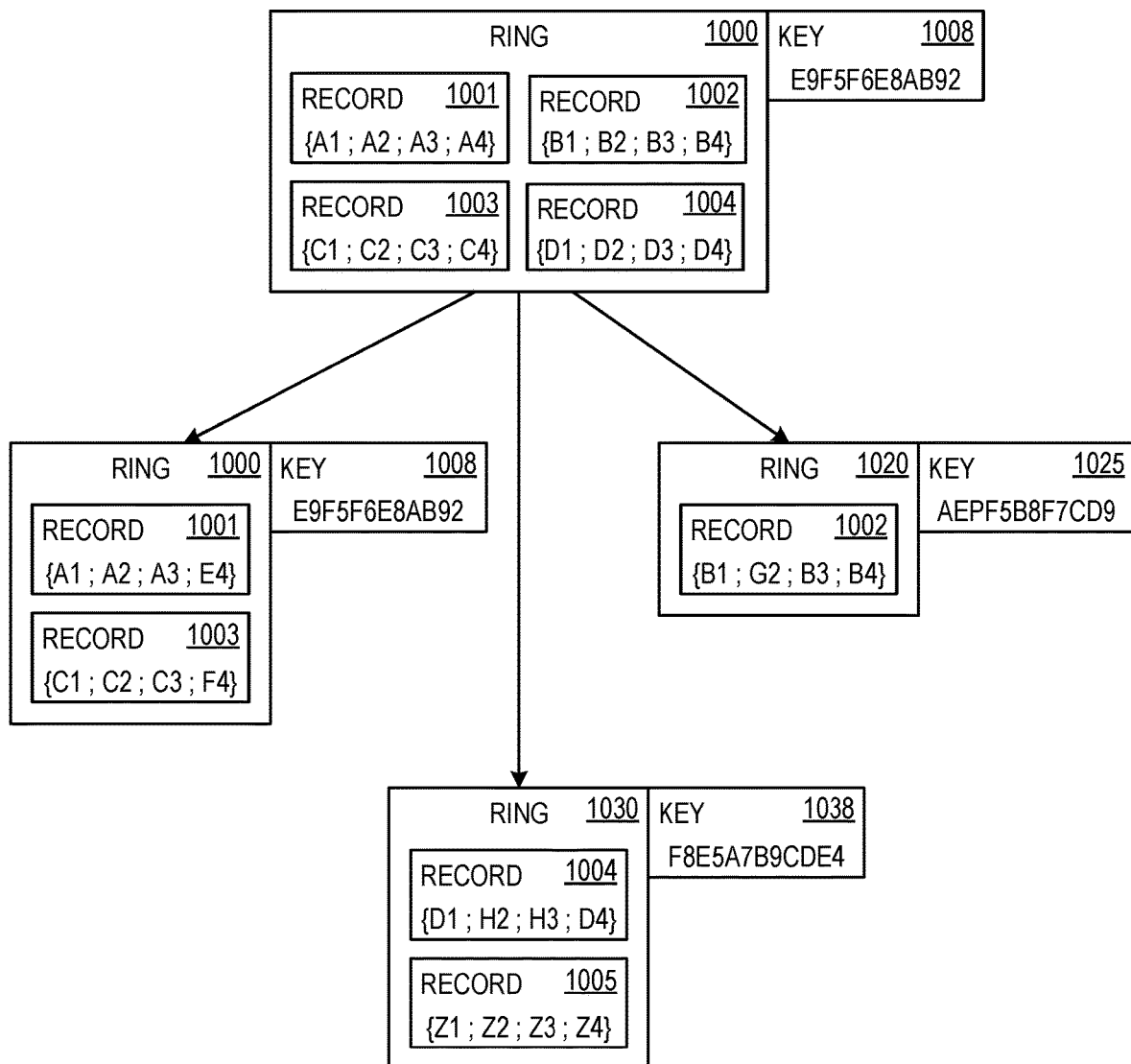
FIG. 10 is a graphical depiction of the effect of data record changes.

FIG. 10 highlights the need for data unification after changes have occurred to data records, and uses the example of a graphical depiction of a key ring 1000 splitting into three key rings 1000 (a smaller version), 1020, and 1030. Key rings differ from stableIDs, in that stableIDs are used to stamp the primary key values based on policies described above, whereas a key ring is logical grouping of data records identified as having the same data subject. Key rings enable co-location of customer data in a single node. In FIG. 10, key ring 1000 initially has a key 1008 and four data records 1001-1004 that are identified as having the same data subject (e.g., the same physical person). With new information coming in, data record 1001, originally having content {A1; A2; A3; A4}, now has content {A1; A2; A3; E4}. Data record 1002, originally having content {B1; B2; B3; B4}, now has content {B1; G2; B3; B4}. Data record 1003, originally having content {C1; C2; C3; C4}, now has content {C1; C2; C3; F4}. Data record 1004, originally having content {D1; D2; D3; D4}, now has content {D1; H2; H3; D4}.

Because the changes to data records 1001 and 1003 are minor, they remain within key ring 1000. However, data record 1002 changes sufficiently to be removed from key ring 1000 and interpreted as being for a different subject. A new key ring 1020, with a new key 1028, is created for data record 1002. Similarly, data record 1004 changes sufficiently to be removed from key ring 1000 and interpreted as being for yet another different subject. A new key ring 1030, with a new key 1038, is created for data record 1004. A new incoming data record 1005 is interpreted as having the same data subject as data record 1004 and so is added to key ring 1030. As a result of this split, the need for data unification is identifiable.

Figure 11:
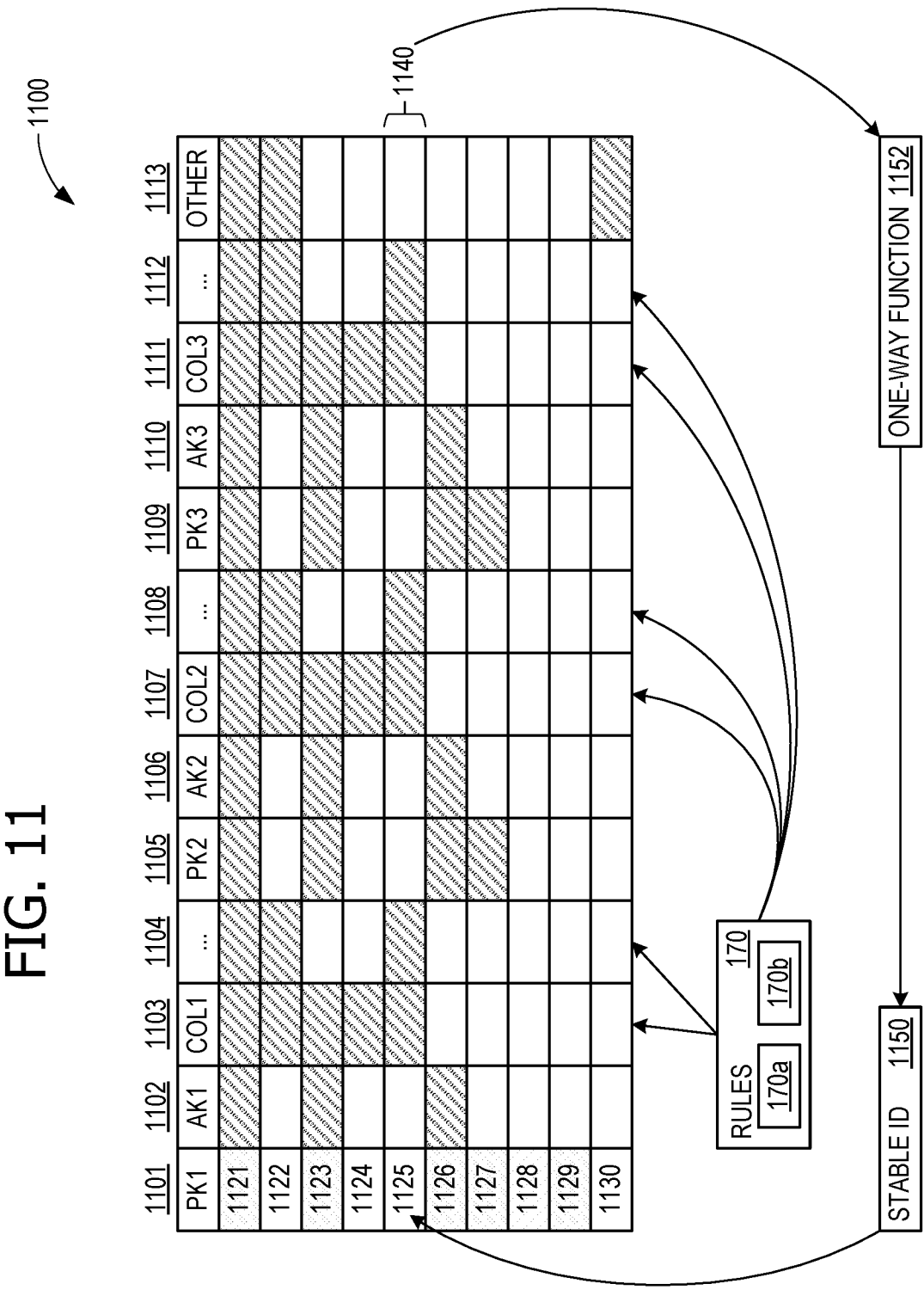
FIG. 11 is a graphical depiction of selecting data fields for generating the stableID, as occur in the arrangement of FIG. 1.
Figure 12:
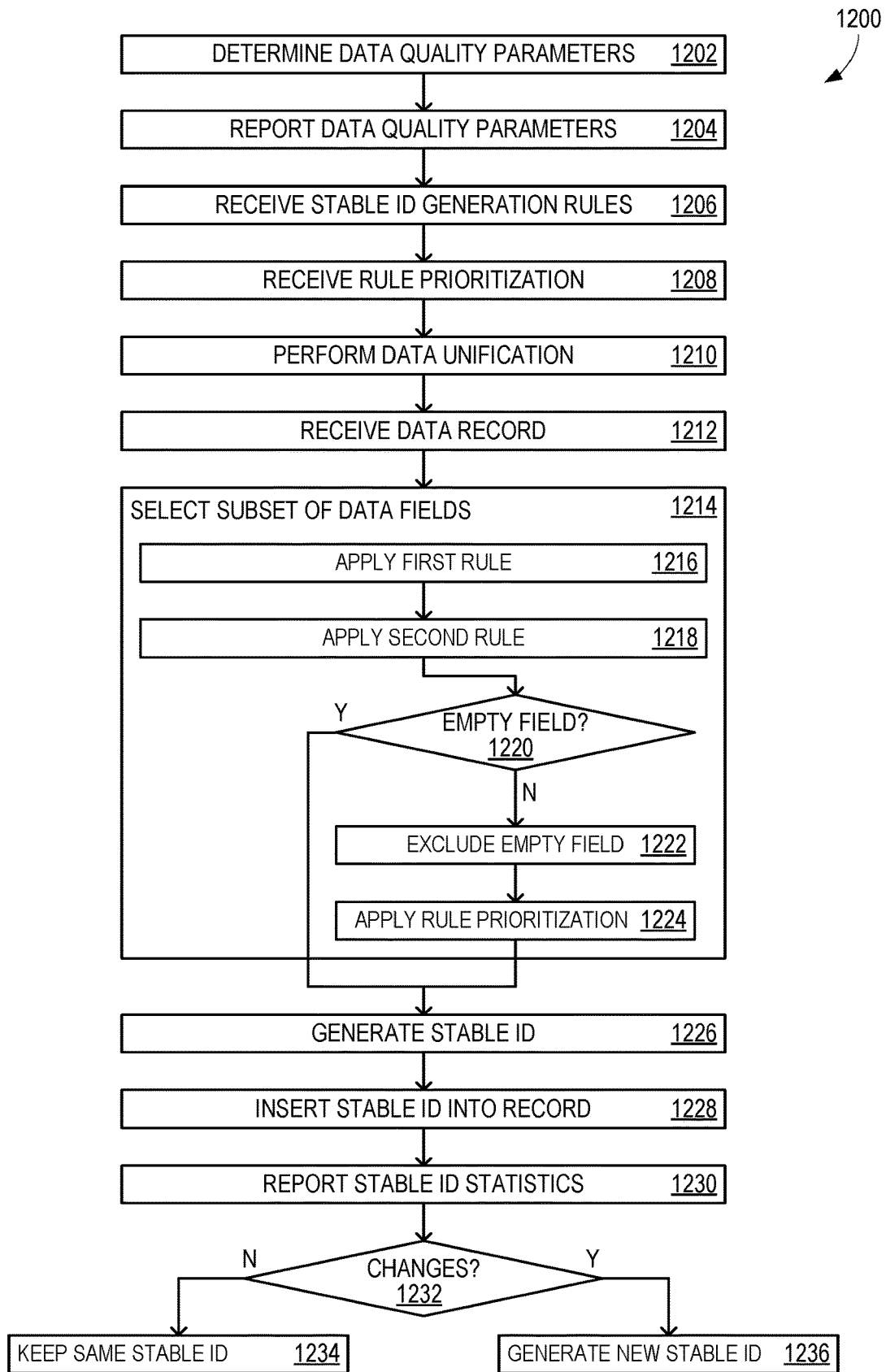
FIG. 12 is another flowchart illustrating exemplary operations that may be performed by the arrangement of FIG. 1.

FIG. 11 is a graphical depiction of selecting data fields for generating a stableID (e.g., stableID 1150 of FIG. 11) for a data record, for example using flowchart 1200 of FIG. 12. There are 10 data records 1120-1130 represented, with each having data fields 1101-1113. Data field 1101 is the primary key field for each data record. The highlighted fields (diagonal lines) represent data fields within each data record that are selected for use in generating stableID 1150.

The selection of data fields used for generating stableID 1150 determines the sensitivity of stableID 1150 to changes in a data record. Sensitivity is ranked from most sensitive at the top of FIG. 11 (data record 1121) to least sensitive at the bottom of FIG. 11 (data record 1130). That is, data record 1121 is the most sensitive to changes, because all of the data fields are used. This means that a change to any one of the data fields may change a generated record ID for data record 1121. As a result, it is preferable to use a subset, less than all, of the data fields for generating stableID 1150.

For data record 1122, data field 1103, data field 1104, data field 1107, data field 1108, data field 1111, data field 1112, and data field 1113 are selected. This provides less sensitivity, making a stableID generated for data record 1122 more stable than an automatically generated record ID for data record 1121. For data record 1123, data field 1101, data field 1102, data field 1103, data field 1105, data field 1106, data field 1107, data field 1109, data field 1110, and data field 1111 are selected. Based on the nature of the data fields in this notional example, this provides even less sensitivity than for data record 1122.

Continuing, as sensitivity drops, for data record 1124, data fields 1103, 1107, and 1111 are selected. For data record 1125, data fields 1103, 1104, 1107, 1108, 1111, and 1112 are selected. For data record 1126, data fields 1101, 1102, 1105, 1106, 1109, and 1110 are selected. For data record 1127, data fields 1101, 1105, and 1119 are selected. For data record 1128 and data record 1129, only data field 1101 is selected, but different aspects of data field 1101 may change, providing a sensitivity difference. For data record 1130, only data field 1113 is selected, which may be unlikely to change (e.g., stable).

Generation of stableID 1150 is described for data record 1125. Rules 170 is shown as having two rules 170a and 170b, although a different number may be used in some examples. Rule 170a and rule 170b are both used to select a subset 1140 of data fields 1101-1113, specifically data fields 1103, 1104, 1107, 1108, 1111, and 1112. Some data fields may be selected by rule 170a and additional data fields may be selected by rule 170b. Subset 1140 is provided to a one-way function 1152, which may be a hash function, which operates on the content of those data fields to produce stableID 1150. In some examples, one-way function 1152 concatenates the contents of data fields of subset 1140 and hashes the concatenation. StableID 1150 is inserted into the primary key data field 1101 of data record 1125.

FIG. 12 is a flowchart 1200 illustrating exemplary operations associated with arrangement 100. In some examples, operations described for flowchart 1200 are performed by computing device 1500 of FIG. 15. Flowchart 1200 commences with operation 1202, which includes 1202 determining data quality parameters for a plurality of the data fields in a plurality of data records. In some examples, the data quality parameters include null, duplication, and/or inconsistency conditions. Operation 1204 includes generating a report (e.g., report 190) of the data quality parameters for the plurality of the data fields. This information may assist users in selecting the data fields that are likely to provide stableIDs that are less sensitive to data changes, for example by identifying how rapidly some data fields change or are left empty.

Operation 1206 includes receiving, from a user input, rule 170a and rule 170b. Rule 170a comprises a rule for identifying data fields marked as having stable content. In some examples, the user input comprises a drag-and-drop operation in a user interface (UI). Operation 1208 includes receiving, from a user input, a prioritization of multiple rules. Prioritization of rules may be used when data fields that are selected in an applied rule are not useable (e.g., null or incomplete), and so alternate data fields are to be used. Operation 1210 includes performing a data unification process. See the description of operation 906 of FIG. 9. The remainder of FIG. 12 is a portion of the data unification process.

Operation 1212 includes receiving data record 1125, comprising a plurality of data fields 1101-1113. Operation 1214 selects, from among data fields 1101-1113, subset 1140 of the data fields, using operations 1216-1224. Subset 1140 of the data fields is fewer in number than the plurality of data fields 1101-1113 (e.g., six versus 13). In some examples, subset 1140 of the data fields comprise critical columns in a table format of data record 1125.

Operation 1216 applies rule 170a to select at least a first one of the data fields (e.g., data field 1103) within data record 1125 for inclusion in subset 1140 of the data fields. In some examples, rule 170a is further applied to select another of the data fields (e.g., data field 1104) within data record 1125 for inclusion in subset 1140 of the data fields. Operation 1218 applies rule 170b to select at least a second one of the data fields (e.g., data field 1107) within data record 1125 for inclusion in subset 1140 of the data fields. Decision operation 1220 determines whether one of the data fields within data record 1125 is empty (e.g., like record 3061 of FIG. 3). If so, based on at least determining that the data field is empty, operation 1222 excludes the empty data field from subset 1140 of the data fields. Operation 1224 determines, from among rules 170, a priority of application, and applies the selected rule to select an alternate field in place of the excluded empty field. In some examples, determining the priority of application comprises prioritizing rules according to the user input.

Operation 1226 includes, using content of subset 1140 of the data fields, generating stableID 1150 for data record 1125. In some examples, generating stableID 1150 for data record 1125 comprises performing one-way function 1152 on the content of subset 1140 of the data fields. In some examples, one-way function 1152 comprises a hash function. Multiple passes through flowchart 1200 generates a plurality of stableIDs for a plurality of data records, with each stableIDs likely to be unique, if one-way function 1152 is selected to have a low probability of collision.

Operation 1228 inserts stableID 1150 into primary key data field 1101 of data record 1125. In some examples, inserting stableID 1150 into primary key data field 1101 of data record 1125 comprises inserting stableID 1150 into the primary key data field of a winner record (see FIG. 3). Operation 1230 includes reporting a count of stableID duplicates and/or reporting a count of stableIDs generated using each rule (of rules 170). This assists users in refining rules 170 and/or selecting a different one-way function 1152. Decision operation 1232 identifies whether there has been any changes to the content of subset 1140 of the data fields. If so, a new stableID is generated in operation 1236. Otherwise, stableID 1150 is retained in box 1234.

Figure 13:
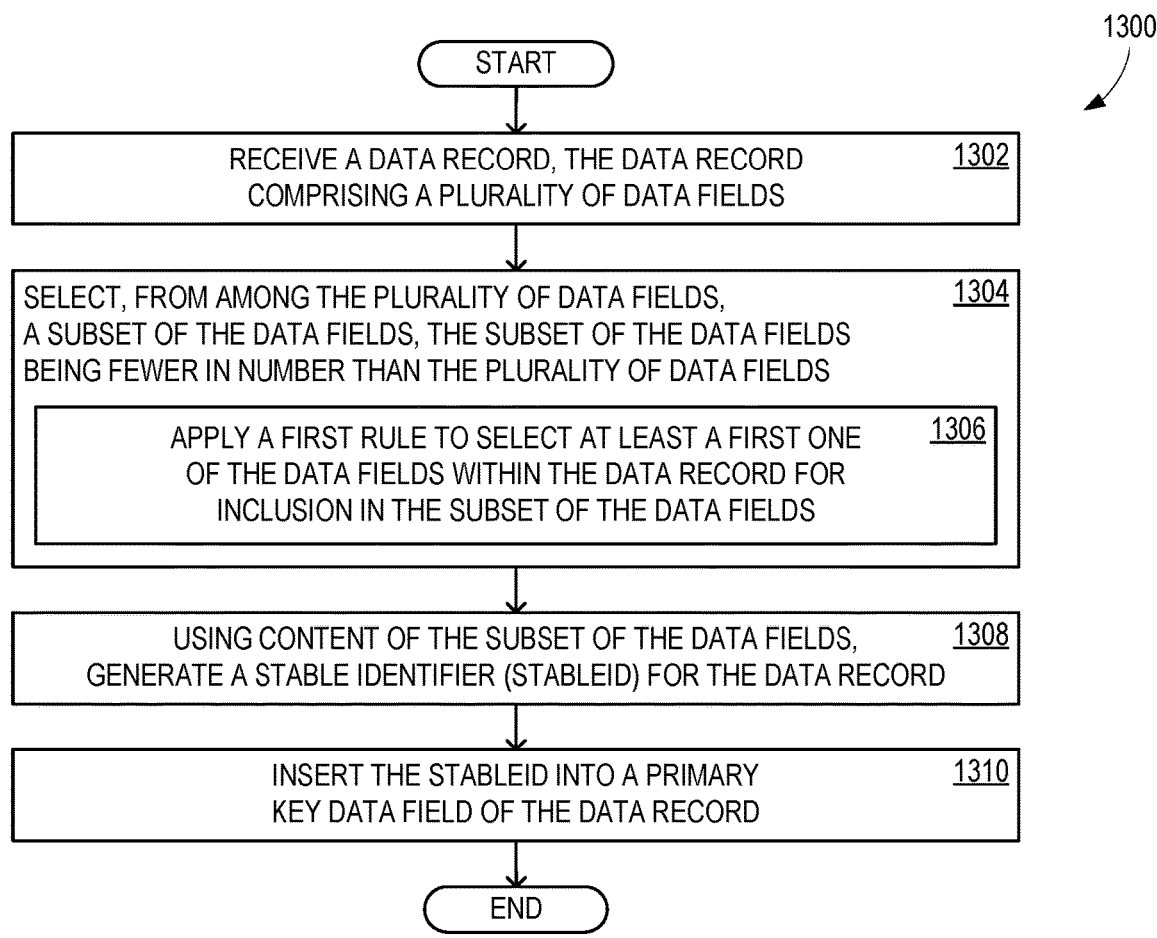
FIG. 13 is another flowchart illustrating exemplary operations that may be performed by the arrangement of FIG. 1.

FIG. 13 is a flowchart 1300 illustrating exemplary operations associated with arrangement 100. In some examples, operations described for flowchart 1300 are performed by computing device 1500 of FIG. 15. Flowchart 1300 commences with operation 1302, which includes which includes receiving a data record, the data record comprising a plurality of data fields. Operation 1304 includes selecting, from among the plurality of data fields, a subset of the data fields, the subset of the data fields being fewer in number than the plurality of data fields.

Operation 1304 is performed using operation 1306, which includes applying a first rule to select at least a first one of the data fields within the data record for inclusion in the subset of the data fields. Operation 1308 includes using content of the subset of the data fields, generating a stableID for the data record. Operation 1310 includes inserting the stableID into a primary key data field of the data record.

Figure 14:
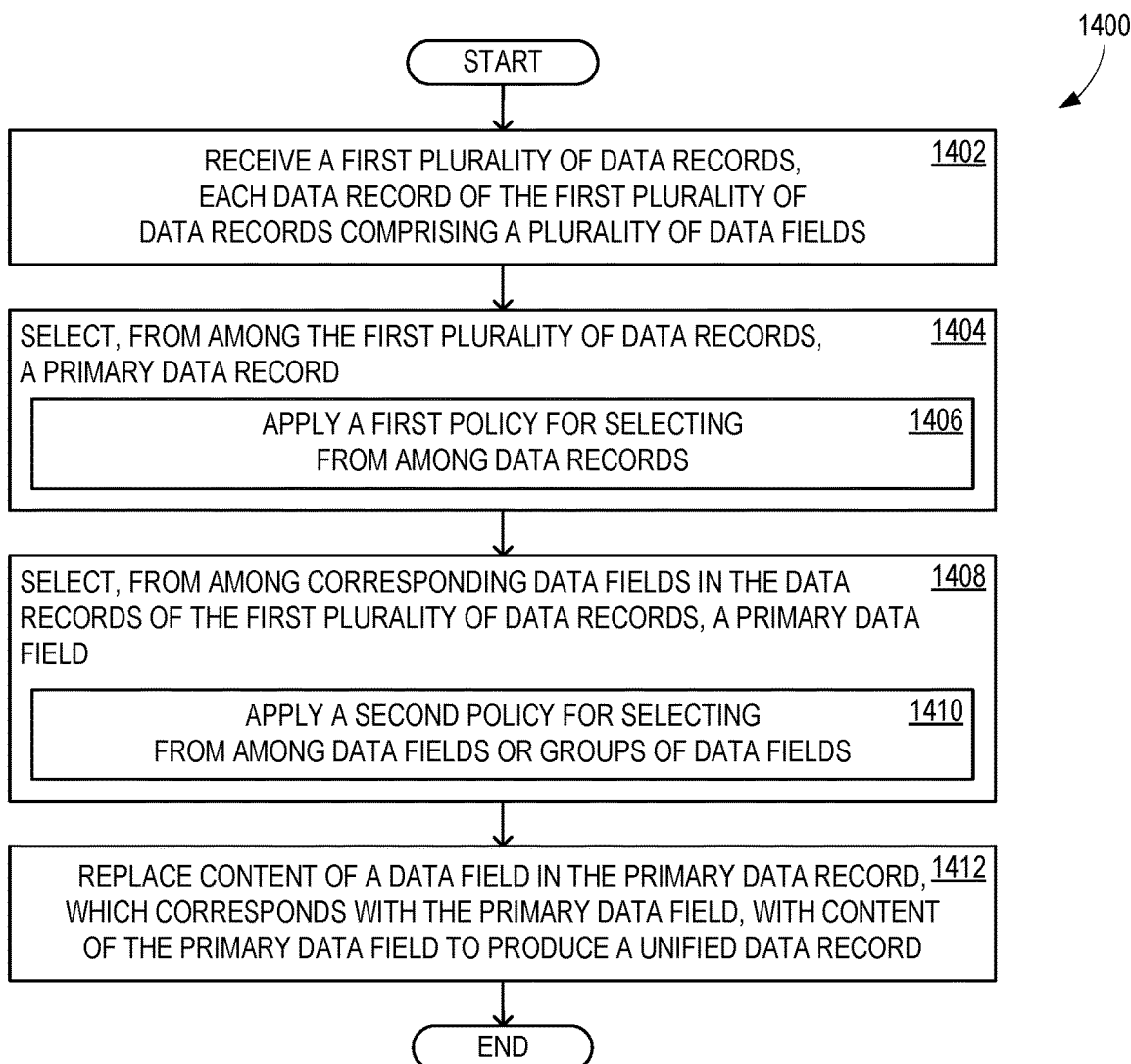
FIG. 14 is another flowchart illustrating exemplary operations that may be performed by the arrangement of FIG. 1.

FIG. 14 is a flowchart 1400 illustrating exemplary operations associated with arrangement 100. In some examples, operations described for flowchart 1400 are performed by computing device 1500 of FIG. 15. Flowchart 1400 commences with operation 1402, which includes receiving a first plurality of data records, each data record of the first plurality of data records comprising a plurality of data fields. Operation 1404 includes selecting, from among the first plurality of data records, a primary data record.

Operation 1404 is performed using operation 1406, which includes applying a first policy for selecting from among data records. Operation 1408 includes selecting, from among corresponding data fields in the data records of the first plurality of data records, a primary data field. Operation 1408 is performed using operation 1410, which includes applying a second policy for selecting from among data fields or groups of data fields. Operation 1412 includes replacing content of a data field in the primary data record, which corresponds with the primary data field, with content of the primary data field to produce a unified data record.

Additional Examples

An example method of data unification comprises: receiving a data record, the data record comprising a plurality of data fields; selecting, from among the plurality of data fields, a subset of the data fields, the subset of the data fields being fewer in number than the plurality of data fields, wherein selecting the subset of the data fields comprises: applying a first rule to select at least a first one of the data fields within the data record for inclusion in the subset of the data fields; using content of the subset of the data fields, generating a stableID for the data record; and inserting the stableID into a primary key data field of the data record.

Another example method of data unification comprises: receiving a first plurality of data records, each data record of the first plurality of data records comprising a plurality of data fields; selecting, from among the first plurality of data records, a primary data record, wherein selecting the primary data record comprises: applying a first policy for selecting from among data records; selecting, from among corresponding data fields in the data records of the first plurality of data records, a primary data field, wherein selecting the primary data field comprises: applying a second policy for selecting from among data fields or groups of data fields; and replacing content of a data field in the primary data record, which corresponds with the primary data field, with content of the primary data field to produce a unified data record.

Another example method of data unification comprises: indexing data structures according to a conflation plan; co-locating a first set of data records of a plurality of data records in a first node of a distributed network, each data record in the first set of data records having a stableID, wherein two or more of the stableIDs for the first set of data records are identified as expected to be searched together; and co-locating a second set of data records of the plurality of data records in a second node of the distributed network, each data record in the second set of data records having a stableID, wherein two or more of the stableIDs for the second set of data records are identified as expected to be searched together, and wherein the two or more of the stableIDs for the first set of data records are identified as expected to not be searched together with the two or more of the stableIDs for the second set of data records.

An example system for data unification comprises: a processor; and a computer-readable medium storing instructions that are operative upon execution by the processor to: receive a data record, the data record comprising a plurality of data fields; select, from among the plurality of data fields, a subset of the data fields, the subset of the data fields being fewer in number than the plurality of data fields, wherein selecting the subset of the data fields comprises: applying a first rule to select at least a first one of the data fields within the data record for inclusion in the subset of the data fields; using content of the subset of the data fields, generate a stableID for the data record; and insert the stableID into a primary key data field of the data record.

Another example system for data unification comprises: a processor; and a computer-readable medium storing instructions that are operative upon execution by the processor to: receive a first plurality of data records, each data record of the first plurality of data records comprising a plurality of data fields; select, from among the first plurality of data records, a primary data record, wherein selecting the primary data record comprises: applying a first policy for selecting from among data records; select, from among corresponding data fields in the data records of the first plurality of data records, a primary data field, wherein selecting the primary data field comprises: applying a second policy for selecting from among data fields or groups of data fields; and replace content of a data field in the primary data record, which corresponds with the primary data field, with content of the primary data field to produce a unified data record.

One or more example computer storage devices has computer-executable instructions stored thereon, which, on execution by a computer, cause the computer to perform operations comprising: receiving a data record, the data record comprising a plurality of data fields; selecting, from among the plurality of data fields, a subset of the data fields, the subset of the data fields being fewer in number than the plurality of data fields, wherein selecting the subset of the data fields comprises: applying a first rule to select at least a first one of the data fields within the data record for inclusion in the subset of the data fields; using content of the subset of the data fields, generating a stableID for the data record; and inserting the stableID into a primary key data field of the data record.

One or more example computer storage devices has computer-executable instructions stored thereon, which, on execution by a computer, cause the computer to perform operations comprising: receiving a first plurality of data records, each data record of the first plurality of data records comprising a plurality of data fields; selecting, from among the first plurality of data records, a primary data record, wherein selecting the primary data record comprises: applying a first policy for selecting from among data records; selecting, from among corresponding data fields in the data records of the first plurality of data records, a primary data field, wherein selecting the primary data field comprises: applying a second policy for selecting from among data fields or groups of data fields; and replacing content of a data field in the primary data record, which corresponds with the primary data field, with content of the primary data field to produce a unified data record.

Alternatively, or in addition to the other examples described herein, examples include any combination of the following:
  receiving, from a user input, the first rule;
  applying a second rule to select at least a second one of the data fields within the data record for inclusion in the subset of the data fields;
  determining, from among the first rule and the second rule, a priority of application;
  applying the first rule and applying the second rule is performed according to the priority of application;
  determining data quality parameters for the plurality of the data fields;
  the data quality parameters include null, duplication, and/or inconsistency conditions;
  generating a report of the data quality parameters for the plurality of the data fields;
  generating the stableID for the data record comprises performing a one-way function on the content of the subset of the data fields;
  performing a data unification process;
  the data unification process includes a self-conflation process;
  the self-conflation process identifies at least a winner record;
  inserting the stableID into the primary key data field of the data record comprises inserting the stableID into the primary key data field of the winner record;
  identifying changes to the content of the subset of the data fields;
  based on identifying changes to the content of the subset of the data fields, generating a new stableID;
  the first rule comprises identifying data fields marked as having stable content;
  the subset of the data fields comprise critical columns in a table format of the data record;
  the one-way function comprises a hash function;
  applying the first rule to select at least a third one of the data fields within the data record for inclusion in the subset of the data fields;
  the user input comprises a drag-and-drop operation in a user interface;
  receiving, from a user input, a prioritization of multiple rules;
  determining the priority of application comprises prioritizing user-provided rules ahead of default rules;
  determining the priority of application comprises prioritizing rules according to the user input;
  determining whether a fourth one of the data fields within the data record is empty;
  based on at least determining that the fourth data field is empty, excluding the fourth data field from the subset of the data fields;

generating a plurality of stableIDs for a plurality of data records;
reporting a count of stableID duplicates;
reporting a count of stableIDs generated using each rule;
the indexing data structures support fuzzy matching;
applying a second policy for selecting from among data fields or groups of data fields;
the first policy and the second policy each comprises a policy selected from the list consisting of: most recent, least recent, and most valid;
determining that applying the second policy is unsuccessful;
based on at least determining that applying the second policy is unsuccessful, applying a third policy for selecting from among data fields or groups of data fields;
receiving a second plurality of data records;
the second plurality of data records includes the first plurality of data records;
performing clustering of the second plurality of data records;
identifying the first plurality data records as a clustered subset, less than all, of the second plurality of data records.
the clustering comprises performing in-memory local clustering for a plurality of partitions;
the clustering comprises integrating clustering results;
the clustering comprises based on at least the clustering results, merging edges;
the clustering comprises repeating the local clustering, integrating, and merging until all edge weights exceed a distance threshold;
using content of a subset of data fields of the unified data record to generate a stableID for the final data record;
inserting the stableID into a primary key data field of the unified data record;
performing a data unification process;
the data unification process includes a self-conflation process;
the self-conflation process produces the unified data record from the first plurality of data records;
receiving, from a user input, the first policy and/or the second policy;
the most valid policy comprises a most filled policy;
applying the most valid policy comprises determining a validity score;
applying the most valid policy comprises selecting the highest validity score;
the clustering is performed in parallel among distributed compute nodes;
the clustering comprises partition-based distributed agglomerative hierarchical clustering; and
performing deduplication after the clustering.

While the aspects of the disclosure have been described in terms of various examples with their associated operations, a person skilled in the art would appreciate that a combination of operations from any number of different examples is also within scope of the aspects of the disclosure.

Example Operating Environment

Figure 15:
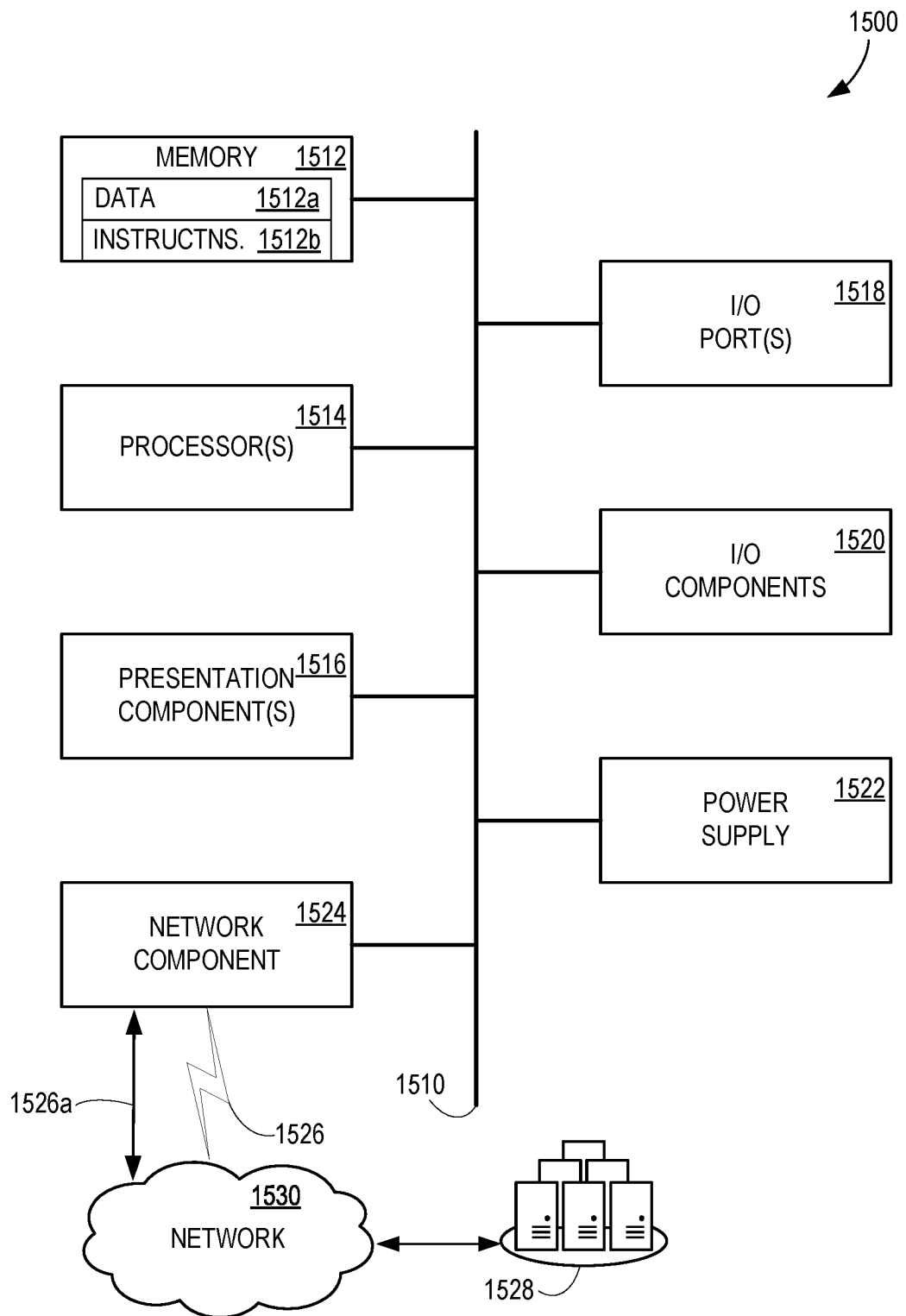
FIG. 15 is a block diagram of an example computing environment suitable for implementing some of the various examples disclosed herein.

FIG. 15 is a block diagram of an example computing device 1500 for implementing aspects disclosed herein, and is designated generally as computing device 1500. In some examples, one or more computing devices 1500 are provided for an on-premises computing solution. In some examples, one or more computing devices 1500 are provided as a cloud computing solution. In some examples, a combination of on-premises and cloud computing solutions are used. Computing device 1500 is but one example of a suitable computing environment and is not intended to suggest any limitation as to the scope of use or functionality of the examples disclosed herein, whether used singly or as part of a larger set.

Neither should computing device 1500 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1500 includes a bus 1510 that directly or indirectly couples the following devices: computer-storage memory 1512, one or more processors 1514, one or more presentation components 1516, I/O ports 1518, I/O components 1520, a power supply 1522, and a network component 1524. While computing device 1500 is depicted as a seemingly single device, multiple computing devices 1500 may work together and share the depicted device resources. For example, memory 1512 may be distributed across multiple devices, and processor(s) 1514 may be housed with different devices.

Bus 1510 represents what may be one or more busses (such as an address bus, data bus, or a combination thereof). Although the various blocks of FIG. 15 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 15 and the references herein to a "computing device." Memory 1512 may take the form of the computer-storage media references below and operatively provide storage of computer-readable instructions, data structures, program modules and other data for the computing device 1500. In some examples, memory 1512 stores one or more of an operating system, a universal application platform, or other program modules and program data. Memory 1512 is thus able to store and access data 1512a and instructions 1512b that are executable by processor 1514 and configured to carry out the various operations disclosed herein.

In some examples, memory 1512 includes computer-storage media in the form of volatile and/or nonvolatile memory, removable or non-removable memory, data disks in virtual environments, or a combination thereof. Memory 1512 may include any quantity of memory associated with or accessible by the computing device 1500. Memory 1512 may be internal to the computing device 1500 (as shown in FIG. 15), external to the computing device 1500 (not shown), or both (not shown). Examples of memory 1512 include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1500. Additionally, or alternatively, the memory 1512 may be distributed across multiple computing devices 1500, for example, in a virtualized environment in which instruction processing is carried out on multiple computing devices 1500. For the purposes of this disclosure, "computer storage media," "computer-storage memory," "memory," and "memory devices" are synonymous terms for the computer-storage memory 1512, and none of these terms include carrier waves or propagating signaling.

Processor(s) 1514 may include any quantity of processing units that read data from various entities, such as memory 1512 or I/O components 1520. Specifically, processor(s) 1514 are programmed to execute computer-executable instructions for implementing aspects of the disclosure. The instructions may be performed by the processor, by multiple processors within the computing device 1500, or by a processor external to the client computing device 1500. In some examples, the processor(s) 1514 are programmed to execute instructions such as those illustrated in the flow charts discussed below and depicted in the accompanying drawings. Moreover, in some examples, the processor(s) 1514 represent an implementation of analog techniques to perform the operations described herein. For example, the operations may be performed by an analog client computing device 1500 and/or a digital client computing device 1500. Presentation component(s) 1516 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1500, across a wired connection, or in other ways. I/O ports 1518 allow computing device 1500 to be logically coupled to other devices including I/O components 1520, some of which may be built in. Example I/O components 1520 include, for example but without limitation, a microphone, joystick, game pad, satellite dish, scanner, printer, wireless device, etc.

The computing device 1500 may operate in a networked environment via the network component 1524 using logical connections to one or more remote computers. In some examples, the network component 1524 includes a network interface card and/or computer-executable instructions (e.g., a driver) for operating the network interface card. Communication between the computing device 1500 and other devices may occur using any protocol or mechanism over any wired or wireless connection. In some examples, network component 1524 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1524 communicates over wireless communication link 1526 and/or a wired communication link 1526*a* to a cloud resource 1528 across network 1530. Various different examples of communication links 1526 and 1526*a* include a wireless connection, a wired connection, and/or a dedicated link, and in some examples, at least a portion is routed through the internet.

Although described in connection with an example computing device 1500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of data unification, the method comprising:
receiving a conflation plan;
building an index for each partition of a plurality of indexed partitions;
receiving a first plurality of data records;
generating an updated first plurality of data records by performing a data unification process based on the conflation plan for the first plurality of data records, wherein the data unification process comprises performing an in-memory clustering for each partition of the plurality of indexed partitions in parallel;
receiving a second plurality of data records;
generating a plurality of merged data records by merging the second plurality of data records and the updated first plurality of data records;
generating a stable identifier (stableID) for each data record of the plurality of merged data records; and
updating each index of each partition of the plurality of indexed partitions with the plurality of merged data records.

2. The method of claim 1, further comprising:
co-locating a plurality of data records of the plurality of merged data records in a node of a distributed network, wherein two or more of the stableIDs for the plurality of data records are identified as expected to be searched together.

3. The method of claim 1, further comprising:
receiving a data query; and
handling the data query per-partition in parallel for the plurality of indexed partitions.

4. The method of claim 1, further comprising:
indexing data structures according to the conflation plan, wherein the data structures are used to support a fuzzy search in the plurality of indexed partitions.

5. The method of claim 4, further comprising:
running the fuzzy search in the plurality of indexed partitions.

6. The method of claim 1, wherein each index for each partition of the plurality of indexed partitions is based on a mapping of a signature to a record identifier.

7. The method of claim 1, wherein performing the unification process based on the conflation plan comprises performing in-memory local clustering.

8. The method of claim 1, wherein updating the index for each partition of the plurality of indexed partitions comprises comparing the plurality of merged data records and the updated first plurality of data records to determine insertions, updates, or deletions.

9. A system for data unification, the system comprising:
a processor; and
a computer storage media storing instructions that are operative upon execution by the processor to:
receive a conflation plan;
receive a first plurality of data records;
build an index for each partition of a plurality of indexed partitions;
generate an updated first plurality of data records by performing a data unification process based on the conflation plan for the first plurality of data records, wherein the data unification process comprises performing an in-memory clustering for each partition of the plurality of indexed partitions in parallel;
receive a second plurality of data records;
generate a plurality of merged data records by merging the second plurality of data records and the updated first plurality of data records;
generate a stable identifier (stableID) for each data record of the plurality of merged data records; and
update each index of each partition of the plurality of indexed partitions with the plurality of merged data records.

10. The system of claim 9, wherein the instructions are further operative to:
co-locate a plurality of data records of the plurality of merged data records in a node of a distributed network, wherein two or more of the stableIDs for the plurality of data records are identified as expected to be searched together.

11. The system of claim 9, wherein the instructions are further operative to:
receive a data query; and
handle the data query per-partition in parallel for the plurality of indexed partitions.

12. The system of claim 9, wherein the instructions are further operative to:
index data structures according to the conflation plan, wherein the data structures are used to support a fuzzy search in the plurality of indexed partitions.

13. The system of claim 12, wherein the instructions are further operative to:
run the fuzzy search in the plurality of indexed partitions.

14. The system of claim 9, wherein each index for each partition of the plurality of indexed partitions is based on a mapping of a signature to a record identifier.

15. The system of claim 9, wherein performing the unification process based on the conflation plan comprises performing in-memory local clustering.

16. The system of claim 9, wherein updating the index for each partition of the plurality of indexed partitions comprises comparing the plurality of merged data records and the updated first plurality of data records to determine insertions, updates, or deletions.

17. A computer storage device having computer-executable instructions stored thereon, which, on execution by a computer, cause the computer to perform operations comprising:
receiving a conflation plan;
receiving a first plurality of data records;
building an index for each partition of a plurality of indexed partitions;
generating an updated first plurality of data records by performing a data unification process based on the conflation plan for the first plurality of data records, wherein the data unification process comprises performing an in-memory clustering for each partition of the plurality of indexed partitions in parallel;
receiving a second plurality of data records;
generating a plurality of merged data records by merging the second plurality of data records and the updated first plurality of data records;
generating a stable identifier (stableID) for each data record of the plurality of merged data records; and
updating each index of each partition of the plurality of indexed partitions with the plurality of merged data records.

18. The computer storage device of claim 17, wherein the operations further comprise:
co-locating a plurality of data records of the plurality of merged data records in a node of a distributed network, wherein two or more of the stable IDs for the plurality of data records are identified as expected to be searched together.

19. The computer storage device of claim 17, wherein the operations further comprise:
indexing data structures according to the conflation plan, wherein the data structures are used to support a fuzzy search in the plurality of indexed partition;
receiving a data query;
handling the data query per-partition in parallel for the plurality of indexed partitions; and
running the fuzzy search in the plurality of indexed partitions.

20. The computer storage device of claim 17, wherein performing the unification process based on the conflation plan comprises performing in-memory local clustering.

* * * * *